US012770596B2

(12) United States Patent
Storey

(10) Patent No.: US 12,770,596 B2
(45) Date of Patent: Oct. 20, 2026

(54) PRESSURE MEASUREMENT DEVICE FOR USE WITH A MUSICAL INSTRUMENT

(71) Applicant: TUTTI TOOT LTD, Bedfordshire (GB)

(72) Inventor: Gayle Elizabeth Storey, Bedfordshire (GB)

(73) Assignee: TUTTI TOOT LTD, Bedfordshire (GB)

( * ) Notice: Subject to any disclaimer, the term of this patent is extended or adjusted under 35 U.S.C. 154(b) by 956 days.

(21) Appl. No.: 18/013,364

(22) PCT Filed: Jun. 29, 2021

(86) PCT No.: PCT/GB2021/051637
§ 371 (c)(1),
(2) Date: Dec. 28, 2022

(87) PCT Pub. No.: WO2022/003334
PCT Pub. Date: Jan. 6, 2022

(65) Prior Publication Data
US 2023/0282190 A1 Sep. 7, 2023

(30) Foreign Application Priority Data
Jun. 30, 2020 (GB) .................................... 2009978

(51) Int. Cl.
*G10H 1/34* (2006.01)
*G10H 5/00* (2006.01)

(52) U.S. Cl.
CPC ................ *G10H 1/34* (2013.01); *G10H 5/00* (2013.01); *G10H 2210/066* (2013.01);
(Continued)

(58) Field of Classification Search
CPC ...... G10H 1/34; G10H 5/00; G10H 2210/066; G10H 2220/005; G10H 2220/361;
(Continued)

(56) References Cited

U.S. PATENT DOCUMENTS 5,010,801 A * 4/1991 Sakashita .............. G10H 1/053
84/742
5,929,361 A * 7/1999 Tanaka .................. G10H 1/055
84/742
(Continued)

FOREIGN PATENT DOCUMENTS

EP 2434478 A2 3/2012
EP 4167850 B1 7/2024
(Continued)

OTHER PUBLICATIONS

GB Examination Report in Application No. GB2009978.4, dated Apr. 6, 2023, 2 pages.
(Continued)

*Primary Examiner* — Jeffrey Donels
(74) *Attorney, Agent, or Firm* — Day Pitney LLP; George Chaclas; Christopher J. Head

(57) ABSTRACT

A pressure measurement device for use with a musical instrument is provided. The pressure measurement devices has at least one inlet to receive air from a player of the musical instrument as the player plays the musical instrument. The pressure measurement device also has at least one sensor associated with the at least one inlet. The sensor is configured to sense information relating to pressure from the received air in real time as the musical instrument is played.

19 Claims, 13 Drawing Sheets

(52) U.S. Cl.
CPC . *G10H 2220/005* (2013.01); *G10H 2220/361* (2013.01); *G10H 2230/155* (2013.01)

(58) Field of Classification Search
CPC ....... G10H 2230/155; G10H 2220/521; G10H 1/0008; G10H 2230/161; G10H 2230/175; G10H 1/055; G10H 1/32; G10G 7/00; G10D 3/00
See application file for complete search history.

(56) References Cited

U.S. PATENT DOCUMENTS

| | | | | | |
|---|---|---|---|---|---|
| 6,005,180 | A * | 12/1999 | Masuda | G10H 5/007 84/622 |
| 6,570,077 | B1 | 5/2003 | Goss | |
| 10,722,748 | B1 * | 7/2020 | Acosta | A63B 21/06 |
| 2012/0017749 | A1 | 1/2012 | Hashimoto | |
| 2012/0073424 | A1 | 3/2012 | Hashimoto | |
| 2013/0192446 | A1 | 8/2013 | Read et al. | |
| 2015/0348525 | A1 * | 12/2015 | Nakae | G10H 1/053 84/735 |
| 2016/0210949 | A1 * | 7/2016 | Kang | G10H 1/0551 |
| 2018/0082664 | A1 | 3/2018 | Sasaki | |
| 2019/0096374 | A1 | 3/2019 | Harada et al. | |
| 2020/0005752 | A1 * | 1/2020 | Davey | G10H 3/125 |
| 2021/0187351 | A1 * | 6/2021 | Acosta | A63B 23/185 |

FOREIGN PATENT DOCUMENTS

| | | | | |
|---|---|---|---|---|
| GB | 2559144 | A1 | 8/2018 | |
| JP | H02-146595 | A | 6/1990 | |
| JP | 1994-282265 | A2 | 10/1994 | |
| JP | 2004109508 | A | 4/2004 | |
| JP | 201273381 | A | 4/2012 | |
| JP | 2018521367 | A | 8/2018 | |
| JP | 2019128587 | A | 8/2019 | |
| JP | 2023531308 | A * | 7/2023 | G10H 1/055 |
| KR | 20230026417 | A * | 2/2023 | A61B 5/087 |
| WO | WO-2022093427 | A1 * | 5/2022 | G10D 9/06 |

OTHER PUBLICATIONS

JP Examination Report corresponding to Application No. 2022-580868, dated May 26, 2025, 7 pages (English Translation).
GB Search Report in Application No. GB2009978.4, dated Dec. 11, 2020, 2 pages.
International Search Report and Written Opinion for International Application No. PCT/GB/2021/051637, dated Sep. 27, 2021, 12 pages.
JP Examination Report corresponding to Application No. 2022-580868, dated Jan. 16, 2026, 6 pages.
EP Examination Report corresponding to Application No. 21739764.5, dated Jan. 30, 2026, 2 pages.

* cited by examiner 18
10

20
11

20

10

18

19

20
19
20

PRESSURE MEASUREMENT DEVICE FOR USE WITH A MUSICAL INSTRUMENT

CROSS-REFERENCE TO RELATED APPLICATIONS

The present application is a U.S. National Stage Application of International Application No. PCT/GB2021/051637, filed Jun. 29, 2021 and published on Jan. 6, 2022 as WO2022/003334 A1, which claims benefit and priority of Great Britain Patent Application No. GB2009978.4, filed on Jun. 30, 2020, each of which is incorporated herein by reference in its entirety for any purpose whatsoever.

FIELD OF THE DISCLOSURE

The present invention relates generally to the field of pressure measurement devices. In particular, but not exclusively, the invention concerns a pressure measurement device for use with a musical instrument and/or a musical instrument including a pressure measurement device.

BACKGROUND

There are currently approximately 300 million asthma patients worldwide, approximately 150,000 sufferers of Cystic Fibrosis, approximately 65 million people affected by Chronic Obstructive Pulmonary Disease (COPD) which alone is predicted to be the 3rd biggest killer in society worldwide by 2030. Approximately 10,500 people in the United Kingdom have cystic fibrosis (CF).

Cystic fibrosis causes the production of abnormally thick mucus, leading to the blockage of the pancreatic ducts, intestines, and bronchi and often resulting in respiratory infection and shortened life expectancy.

Airway Clearance Treatments (ACTs) are an integral part of care for people with Cystic Fibrosis, Chronic Asthma and COPD but they are burdensome and adherence is known to be suboptimal. Current ACT devices are generally very laborious and uncreative. They are very much medical therapeutic measuring devices only.

Patient non-compliance of twice daily Positive Expiratory Pressure ACT on current devices (Acapella/Flutter) is well known. Non-compliance leads to risk developing infection in their lungs and worse, when infection takes hold, a hospital stay.

It would therefore be an advance in the art to provide a device to create a low impact or enjoyable pastime for a patient that also functions as a positive expiratory pressure airway clearance treatment, which should lead to increased compliance with treatment regimes.

Embodiments of the invention seek to at least partially overcome or ameliorate any one or more of the abovementioned disadvantages or provide the consumer with a useful or commercial choice.

SUMMARY

According to a first aspect of the invention there is provided a pressure measurement device for use with a musical instrument, the device comprising:

a. at least one inlet to receive air from a player of the musical instrument as the player plays the musical instrument; and
b. at least one sensor associated with the at least one inlet;

wherein the at least one sensor is configured to sense information relating to pressure from the received air in real time as the musical instrument is played.

The pressure measurement device may further comprise at least one processor associated with the at least one sensor.

The pressure measurement device may further comprise at least one display to display real-time data relating to information relating to pressure.

The pressure measurement device may be provided as a multi-part device. Any number of parts may be provided in the multi-part device. Any one or more of the components may be provided in any one or more parts.

According to a second aspect of the invention there is provided a musical instrument comprising a pressure measurement device. The pressure measurement device may be the device of the first aspect, optionally including any optional feature set out above.

According to a third aspect of the invention there is provided a pressure measurement system for use with a musical instrument, the system including:

a. a pressure measurement device comprising:
   i. at least one inlet to receive air from a player of the musical instrument as the player plays the musical instrument; and
   ii. at least one sensor associated with the at least one inlet; and
   iii. at least one processor associated with the at least one sensor;

wherein the at least one sensor is configured to sense information relating to pressure from the received air in real time as the musical instrument is played; and b. an associated device operatively associated with the pressure measurement device, the associated device including at least one display to display real-time data relating to information relating to pressure.

According to a fourth aspect of the invention there is provided a musical instrument comprising a pressure measurement system. The pressure measurement system may be the system of the third aspect.

Providing a pressure measurement device or system and/or a musical instrument comprising a pressure measurement device or system will preferably allow a musician playing a musical instrument to see real-time feedback of the amount of breath and/or lung pressure used whilst playing.

The pressure measurement device or system and/or a musical instrument comprising a pressure measurement device or system of the invention preferably provide sufferers of Cystic Fibrosis (CF) Asthma, Chronic Obstructive Pulmonary Disease (COPD) and other respiratory diseases, with a unique method in clearing mucus, exercising their lungs and conditioning their body by playing an adapted or specialised musical instrument, measuring real time lung pressures and performance.

The pressure measurement device or system and/or a musical instrument comprising a pressure measurement device or system preferably measures lung pressure and/or lung capacity of the person playing the musical instrument, in real time and then provides feedback to the person in real-time. The feedback is preferably provided through the display of the level of lung pressure of the person as they play.

The pressure measurement device or system and/or a musical instrument comprising a pressure measurement device or system may upload the measurement information to a software application. This may allow patient, relative and/or clinician review. The software application will preferably contain a mixture of warm up musical therapy games (akin to the repetitive air clearance routines prescribed by CF therapists), a Guitar Herorm style musical game, free play musical zone, and/or electronic 'how to play' methods and lessons.

The pressure measurement device may be a 'Dumb' device which senses information and then transmits the sensed information to an associated device for processing. The associated device may include a display, such as a smartphone or tablet or computer device for example.

The pressure measurement device may be a 'Smart' device which senses, processes and displays information in real-time on a display associated with the device and which is mounted relative to the musical instrument.

The device is preferably a portable device.

The pressure measurement device may have different configurations, tailored to one or more age groups of users. For example, the pressure measurement device may be included in a musical instrument in an inline configuration. This embodiment may be particularly adapted for users between approximately 4-7 years. This embodiment is preferably a bespoke instrument with the pressure measurement device removably incorporated thereinto.

A separate but attachable configuration may be provided for more advanced users or those with their own instrument. The pressure measurement device of this configuration may be adapted to be mounted relative to a conventional instrument such as a trumpet for example (or another instrument that a user blows into) with an air line associated with the mouthpiece thereof to provide the at least one inlet. A bespoke mouthpiece may be needed in order to incorporate the air line to connect the mouthpiece with the pressure measurement device.

In this embodiment, the pressure measurement device may be mounted to the musical instrument in a location and/or orientation such that a display associated with the pressure measurement device can be seen by the user while they are playing the instrument, particularly if the device includes at least one display. When used with a trumpet for example, the display of the device is preferably mounted relative to the lead pipe of the trumpet so that the user can see it clearly.

The at least one inlet will normally be associated with a mouthpiece for a wind instrument, or a musical instrument which is powered or played using a player's breath.

The at least one inlet may be integrated into the mouthpiece. The at least one inlet may be attached to the mouthpiece. The at least one inlet will preferably at least be associated with the mouthpiece such that a portion of the player's breath enters the at least one inlet as the player blows into the mouthpiece.

The at least one inlet is typically associated with an elongate conduit associated with the at least one sensor. Any type of conduit may be provided. The conduit may be flexible or rigid.

The at least one sensor is preferably mounted on or relative to a body that mounts one or more electronic components such as a controller/processor and/or a power supply.

A controller/processor is preferably provided in association with the at least one sensor in order to control the at least one sensor. The controller/processor will typically receive the information relating to pressure from the received air, in real time as the musical instrument is played and convert this information into information relating to the lung pressure of the player and/or use the information to calculate the lung pressure of the player. However, the information relating to pressure need not be converted into a lung pressure measurement in order to be useful to a player. For example, air flow rate information (volumetric flow) may give the player feedback for use in motivating and/or measuring positive expiratory pressure.

The at least one sensor may be a pressure sensor but any other type of sensor that captures information that can be used to convert or calculate into lung pressure could be used.

The electronic components of the device are preferably powered using an onboard power supply. The onboard power supply is preferably one or more batteries. Typically, the one or more batteries are rechargeable batteries. If rechargeable, the one or more batteries may be removable and rechargeable or be rechargeable in situ.

The preferred lung pressure measurement that is arrived at in real-time based on the information sensed, is preferably displayed on the preferred at least one display. The display of the information in real-time is preferably such that the player can see in real-time, the preferred lung pressure whilst playing the instrument.

Usually, a single display is used. The preferred display can be of any type. Preferably, the display is an electronic display screen. In this form, the information will preferably be displayed thereon in the form of one or more generated and displayed interfaces which are updated in real-time based on the information captured by the at least one sensor.

The information may be displayed in any way. For example, a real time measure may be displayed by a moving level or bar that indicates the level at any moment, and changing in real-time. The bar will preferably indicate level in real-time. A simplified 'traffic light' system may be used, with a red level for a level which is too low, an amber level for an intermediate level and a green level for an adequate or therapeutic level.

A trace of level over time may be displayed allowing visualisation of the level over time.

The value of the thresholds between the levels may be adjustable dependent on the particular player/patient and/or pressure desired. A desired level may be indicated on the display.

The information captured by the at least one sensor may be logged/saved. The information may be logged/saved onboard the device in onboard memory. The information may be logged/saved remotely from the device, on a secondary device and at least one communication device may be provided onboard the device to communicate the information to the secondary device.

The information relating to lung pressure measurement based on the information captured by the at least one sensor may be logged/saved. The information may be logged/saved onboard the device in onboard memory. The information may be logged/saved remotely from the device, on a secondary device and at least one communication device may be provided onboard the device to communicate the information to the secondary device.

In one embodiment, a bespoke musical instrument is provided which mimics a real instrument in terms of playability and relative positioning of the mouthpiece and the buttons/keys/valves used to sound different notes. In this embodiment, the bespoke musical instrument may be an electronic instrument, sounding each note electronically based on the player blowing into the mouthpiece and actuation of the buttons/keys/valves. The buttons/keys/valves will typically be associated with an electronics system which identifies the note intended based on the actuation of the buttons/keys/valves and produces a corresponding note based on the actuation of the buttons/keys/valves.

Different bespoke musical instruments may have different configurations, being based on a different base instrument. For example, the bespoke musical instrument may mimic the appearance and operability of any brass instrument, any woodwind instrument or any other instrument which normally operates dependent on the breath of the player. All of these instruments typically include a mouthpiece with an opening into which a player blows, a body which is normally the component relative to which the buttons/keys/valves are located and an outlet/bell, usually through which the player's spent breath leaves the instrument.

The bespoke musical instrument will normally include a mouthpiece with an opening into which a player blows, a body which is normally the component relative to which the buttons/keys/valves are located and an outlet/bell. An outlet is preferably provided through which the spent breath leaves the bespoke musical instrument, but the outlet need not mimic the position of the outlet of the actual instrument.

The at least one inlet of the pressure measurement device is typically associated with the opening in the mouthpiece. The at least one inlet is preferably positioned to receive a representative portion of a player's breath. The at least one inlet is typically mounted within the mouthpiece relative to the opening in the mouthpiece but the position will be dependent upon the instrument as different instruments use different mouth and/or lip positions.

The mouthpiece of the bespoke musical instrument may be a portion which is removably attachable relative to the bespoke musical instrument, typically the body. The mouthpiece of the bespoke musical instrument may be associated with the body in any way. Providing a removably attachable mouthpiece may allow at least partial disassembly of the bespoke musical instrument for transport, cleaning or storage for example.

The mouthpiece will preferably correspond as closely as possible to the shape and configuration of the mouthpiece of the actual instrument being mimicked by the bespoke musical instrument.

The preferred body of the bespoke musical instrument is preferably the main portion of the bespoke musical instrument, normally being the portion held by the player. The body of the bespoke musical instrument will normally be the portion that mounts the buttons/keys/valves to allow the player to designate the note that is intended to be sounded.

The body will typically mount electronic components allowing operation of the at least one sensor. At least one controller/processor is typically provided in association with the body to control the operation of the at least one sensor. Where the bespoke musical instrument is configured to emit sounds electronically based on actuation of the buttons/keys/valves, at least one controller/processor may be provided to control this functionality. A single controller/processor may be provided to control all functionality, or more than one controller/processor may be provided to control different operations.

The at least one controller/processor is preferably associated with the at least one inlet and the buttons/keys/valves and the at least one sensor.

The at least one controller/processor will typically cause a sound to be generated and sounded based on the actuation of the buttons/keys/valves as the player blows into the mouthpiece. The notes are preferably generated and sounded electronically. A base or threshold minimum air pressure may be required to cause a note to be sounded.

At least one emitter, typically at least one speaker is associated with the pressure measurement device in order to emit the notes preferably generated and sounded electronically. Where the bespoke musical instrument includes a bell or outlet, the at least one emitter will preferably be located relative to the bell or outlet.

The at least one emitter may be provided on, in or relative to an external device to sound the note based on the use of the bespoke musical instrument. This configuration will preferably require real-time communication between the bespoke musical instrument and the external device.

Where provided, the at least one controller/processor will typically be powered by at least one battery onboard the bespoke musical instrument. Typically, a single battery is provided. The at least one battery is typically provided in an accessible location relative to the bespoke musical instrument. The at least one battery may be provided at or toward a terminal end of the bespoke musical instrument. In an embodiment, the at least one battery may be provided relative to the preferred bell of the bespoke musical instrument).

The at least one battery is typically rechargeable. Any charging mechanism can be used. For example, an externally accessible charging port may be provided in association with a charging device to allow connection of an electrical cable to charge the at least one battery from an external power source such as mains power. A capacitive charging system may be provided. A capacitive charging coil may be provided onboard the bespoke musical instrument connected to the at least one battery. An external capacitive charging station can then be provided to effect wireless charging of the at least one battery of the bespoke musical instrument. In an embodiment of the bespoke musical instrument with a bell, the capacitive charging coil of the bespoke musical instrument may be provided in the bell such that the bell can be oriented relative to the capacitive charging station to charge the at least one battery. The bell may be provided with an end cap and/or a shaped configuration to engage the capacitive charging station.

The at least one controller/processor will typically operate an onboard software application to receive information from the at least one sensor and/or other inputs on the bespoke musical instrument such as the buttons/keys/valves. The at least one controller/processor via the software application will preferably convert the information from the at least one sensor into a lung pressure measurement, preferably for display. The software application will also preferably operate to sound the notes according to the actuation by the player of the buttons/keys/valves.

Typically, once the lung pressure measurement has been arrived at, a measure of the lung pressure measurement will be displayed on the preferred at least one display.

The at least one display will preferably be provided on the bespoke musical instrument. The at least one display will preferably be provided relative to the body of the bespoke musical instrument. The at least one display will preferably be positioned such that the player can see the display as they play the instrument. For example, for a bespoke trumpet, the at least one display may be located adjacent to the valves/valve buttons, closer to the bell. The at least one display may be offset laterally from the valves/valve buttons as this may mean that the at least one display is more easily viewable around the player's fingers.

The at least one display is preferably integrated into the body of the bespoke musical instrument. The at least one display may be separable from the body. The at least one display may be mounted in an opening in the body. The at least one display may be angled relative to the player to allow the player to see the at least one display more easily when playing.

One or more buttons/keys/valves are typically provided, normally relative to the body of the bespoke musical instrument. The buttons/keys/valves will generally be provided in a location/number/configuration to mimic or simulate the position of the buttons/keys/valves on a real instrument.

The buttons/keys/valves may be electronically actuable. The buttons/keys/valves may be depressible.

In an embodiment, touch actuable buttons/keys/valves may be provided. The touch actuable buttons/keys/valves may be capacitive. Actuation of the buttons/keys/valves may trigger tactile and/or audible feedback. Any feedback may be haptic.

The buttons/keys/valves are preferably integrated into the body of the bespoke musical instrument.

At least some of the components of the pressure measurement system may be provided in a pressure chamber component which may be releasably attachable relative to a main body of the bespoke musical instrument.

The pressure chamber component typically includes an outer housing to protect and contain the working components. The housing may be a multipart housing, with parts of the housing attached to one another to form the housing. The parts may be attached to one another in any way, but one simple method is using screws or the like.

The pressure chamber component may be shaped to correspond with the main body of the bespoke musical instrument. The shape of the pressure chamber component may allow for a mouthpiece to be removable fitted relative to the pressure chamber component. This will allow different mouthpieces to be used with the pressure chamber component for different users and/or the same user at different ages. The removable nature of the mouthpiece will also allow for use of a mouthpiece that can be removed and cleaned and/or sterilised.

The shape of the pressure chamber component may also be such that the pressure chamber component is engageable with the main body in the correct orientation. One or more protrusions may be provided on the pressure chamber component, particularly on an outer portion of a lower end of the housing of the pressure chamber component, to be received in a corresponding opening or depression on the main body, or vice versa. One or more shaped protrusions and openings or depressions may require a user to align the pressure chamber component with the main body for proper engagement.

The pressure chamber component will typically be securable to the main body. Any mechanism may be provided. For example, the pressure chamber component may be provided with a threaded portion and the main body provided with a correspondingly threaded portion. A magnetic mechanism may be preferred because the magnetic components may be provided within the pressure chamber component housing and/or the main body housing and still function to secure the components together. One or more magnets may be provided spaced about a lower end of the pressure chamber component and/or an upper end of the main body.

One or more exhaust openings may be provided through the housing to allow spent air to escape from the pressure chamber component.

A rotating part is typically provided within the pressure chamber component to rotate when air is blown into the pressure chamber component. The rotating component may reciprocate in rotation, rotating back and forth. If reciprocating, the rotating component may be biased in a first position and be rotated to one or more second positions by the air blown into the pressure chamber component against the bias of a biasing component. The biasing component may be as simple as a coil spring. A coils spring can have a first end associated with the rotating component and a second end anchored relative to a fixed position within the pressure chamber component. Multiple fixed positions may be provided to allow adjustment of the biasing force applied. For example, a number of openings may be provided to allow the second end of the coil spring to be received in any one of the openings.

The rotating component may be configured as a spindle. The spindle may have an elongate body extending substantially coaxially with the pressure chamber component. A number of arms may radiate from the elongate body. Each arm may be provide with a shaped portion against which the air blown into the pressure chamber component acts to rotate the spindle.

Each arm may be located in a shaped recess to define limits to the rotation. The shaped recesses may be provided on or into a shaped body. An opening is typically provided in association with each shaped recess to allow spent air to escape from the shaped recess.

A spacer or similar may be provided with a central opening herein to receive a portion of the mouthpiece. Typically, a mouthpiece opening is provided in an upper end of the housing for insertion of an elongate portion of a mouthpiece. The central opening is typically aligned with the mouthpiece opening but spaced from the mouthpiece opening towards the lower end of the pressure chamber component.

An air guide may be provided to guide air blown into the pressure chamber component, through the central opening in the spacer, to the rotating component. The air guide may define a volume with the spacer. One or more openings may be provided in the air guide to guide the air blown into the pressure chamber component to the rotating component.

The working components within the pressure chamber component may be provided as a cassette mechanism and mounted in a receiving slot within the pressure chamber component housing. A central opening may be provided in all components to receive the elongate body of the spindle therethrough.

A lower end of the elongate spindle may be provided with an element that allows a sensor to measure rotation to thereby determine the rotation with a pressure or air being blown into the pressure chamber component. A simple yet robust mechanism may include a magnetic element. A sensor, such as a Hall effect sensor can then be provided to measure one or more characteristics of the magnetic element, such as speed or rotation/reciprocation to determine to a pressure or air being blown into the pressure chamber component.

A mentioned, typically, the sensor will be located in the main body such that when the pressure chamber component is properly mounted relative to the main body, the sensor is located adjacent to the element to be sensed.

The main body will normally include other components such as the battery, a charging port (if a cable is used) and main electronics, for example in the form of a PCB.

A secondary sensor may be provided on the bespoke musical instrument to allow a check to be provided of the pressure or air being blown into the pressure chamber component. The secondary sensor may provide a check on the main sensor and/or may provide a backup, should the main sensor fail. The secondary sensor may the same type as the primary sensor but normally will be of a different, typically a simpler type such as a flow sensor.

In an embodiment, a display is mounted on the main body. The display may include one or more lights or elements that may be lit to give an indication of the pressure. A 'traffic light' system may be used with a red level for a level which is too low, an amber level for an intermediate level and a green level for an adequate or therapeutic level. If the traffic light system is used, the red level may be closest to the user and the green level furthest from the user.

As mentioned above, at least one communication device providing at least one communication pathway is preferably provided on the bespoke musical instrument. The at least one communication device is typically associated with the at least one controller/processor. This may allow the at least one controller/processor to communicate with at least one remote but associated electronic device. The at least one communication device typically allows wireless communication. Any one or more communication protocols could be used.

In another embodiment, the pressure measurement device may be provided in a separate but attachable embodiment, associated with a real instrument, which is played as normal.

In this embodiment, the device will preferably be provided in a housing with which the at least one inlet is associated. The housing will preferably include components such as the at least one controller/processor, and at least one onboard power supply and preferably at least one display in a single unit. The unit is preferably removably attachable to a conventional instrument.

In this configuration, the at least one inlet is preferably provided as an opening of a conduit connected to the housing and associated with the at least one sensor. The preferred conduit will normally be mounted to/relative to the mouthpiece of the conventional instrument such that a representative portion of breath of the player enters the at least one inlet as the player plays the conventional instrument. The mouthpiece may be adapted to include the at least one opening within the mouthpiece.

The at least one sensor is typically provided in the housing.

The preferred unit of this embodiment is typically removably attachable to a conventional instrument. If the preferred unit includes the at least one display, the preferred single unit is preferably attached in a location and orientation which can be seen by the player during play. Any type of attachment mechanism may be used one or more clamps or clips or straps or the like to securely but releasably attach the unit relative to the instrument.

Where provided, the at least one controller/processor will typically be powered by at least one battery onboard the unit. Typically, a single battery is provided. The at least one battery is typically provided in an accessible location relative to the unit. The at least one battery may be provided at or toward a terminal end of the unit.

The at least one battery is typically rechargeable. Any charging mechanism can be used. For example, an externally accessible charging port may be provided in association with a charging device to allow connection of an electrical cable to charge the at least one battery from an external power source such as mains power. A capacitive charging system may be provided. A capacitive charging coil may be provided onboard the unit connected to the at least one battery. An external capacitive charging station can then be provided to effect wireless charging of the at least one battery of the unit.

The at least one controller/processor will typically operate an onboard software application to receive information from the at least one sensor and/or other inputs on the unit. The at least one controller/processor via the software application will preferably convert the information from the at least one sensor into a lung pressure measurement, preferably for display.

Typically, once the lung pressure measurement has been arrived at, a measure of the lung pressure measurement will be displayed on the preferred at least one display.

The at least one display will preferably be provided on the unit. The at least one display will preferably be provided relative to the housing of the unit. The unit will preferably be positioned such that the player can see the display as they play the instrument. For example, for a trumpet, the unit may be located adjacent to the valves/valve buttons, closer to the bell. The unit may be offset laterally from the valves/valve buttons as this may mean that the at least one display is more easily viewable around the player's fingers.

The at least one display may be provided as a part of an external device which is in communication with the unit. The at least one controller/processor may be configured for communication with the external device to as to cause the display information on the external device. This configuration will preferably require real-time communication between the preferred single unit and the external device. One or more appropriate communication device, providing at least one communications pathway between the unit and the external device will normally be provided in the unit.

In this configuration, the instrument with the device attached thereto is preferably played as normal (the instrument will produce sounds according to normal usage) and a lung pressure measurement is displayed on the preferred at least one display.

The pressure measurement device may be associated with at least one software application. Typically, an operating software application is provided on board the device to control the operation of the device, including the at least one sensor and the at least one display (if provided on the device). The operating software application may also control the display of information on at least display if provided on a remote device.

The remote device may be provided with a display whether or not the device is provided with a display. In other words, at least one display may be provided on the device, and/or on a remote device. The information displayed on more than one display may be the same information, similar information or disparate information. For example, at least one display on a remote device may mirror the information displayed on at least one display provided on the device. At least one display on a remote device may display suggested note information for the player to follow while the lung pressure information is displayed on at least one display provided on the device. The software application may monitor the player's accuracy and score the player's accuracy, to turn the treatment using the device, into a game which in turn may stimulate a desire to partake in the treatment.

A software application may be provided on a remote device such that as the instrument is played, the notes are sounded from at least one emitter on the remote device.

An analysis software application or software application part may be provided to analyse the player's breathing as measured by the at least one sensor.

Any one or more parts of the information captured by the at least one sensor and/or calculated by the at least one controller/processor may be logged on the device, and/or on an external device.

DETAILED DESCRIPTION

In order that the invention may be more clearly understood one or more embodiments thereof will now be described, by way of example only, with reference to the accompanying drawings, of which:

Figure 1:
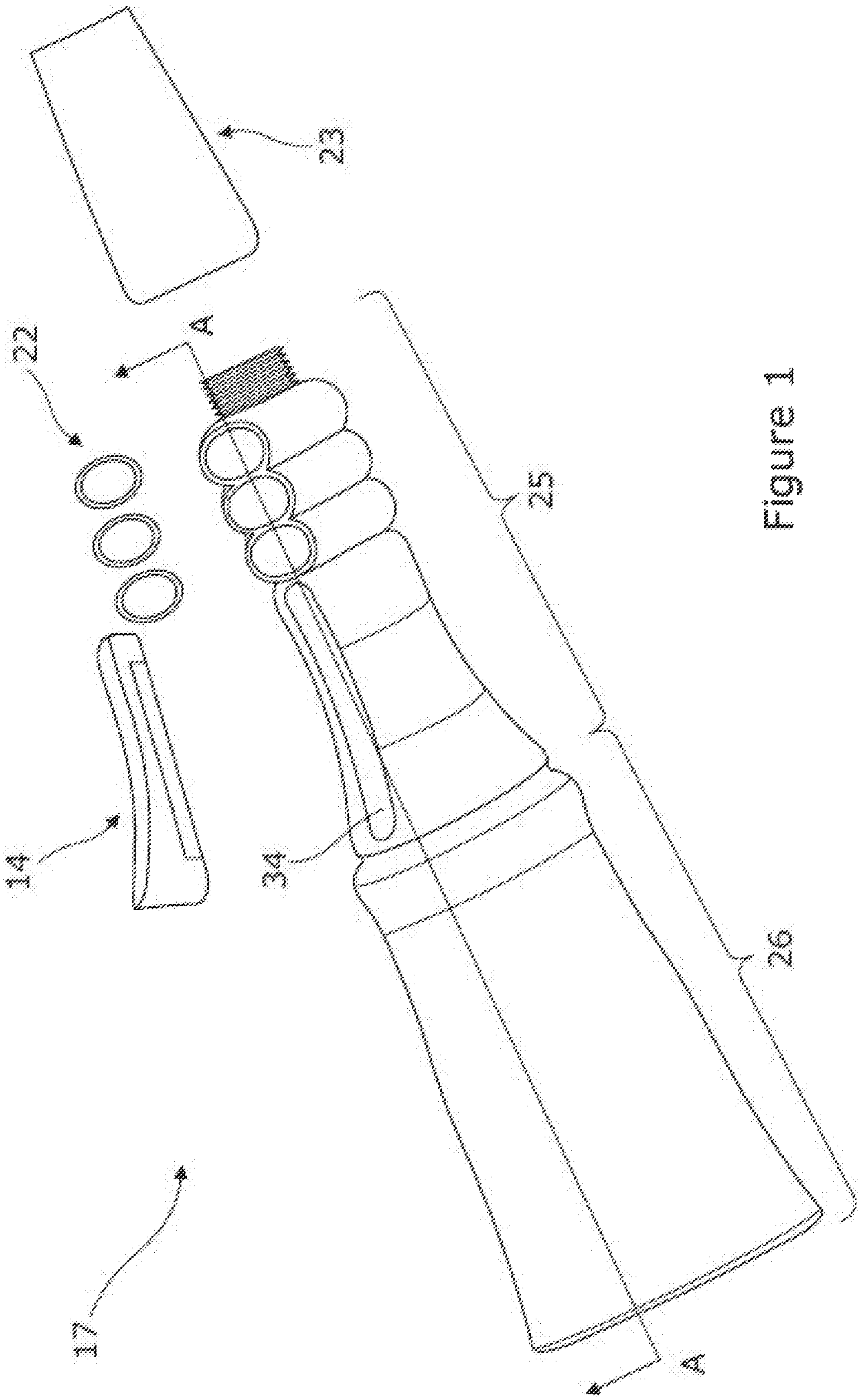
FIG. 1 is an exploded view of a musical instrument incorporating a pressure measurement system associated therewith.
Figure 2:
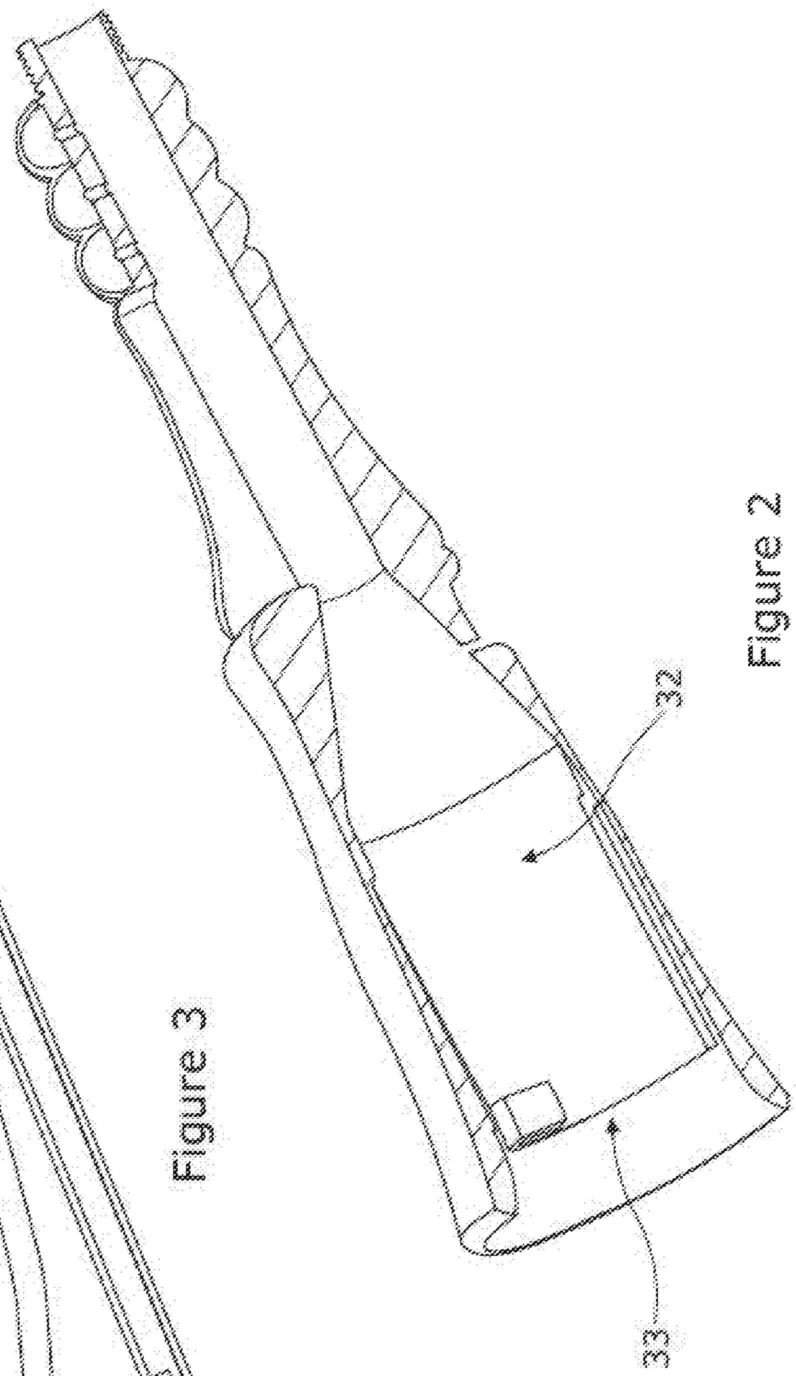
FIG. 2 is a sectional view of the instrument illustrated in FIG. 1 along line A-A with the internal components removed.
Figure 3:
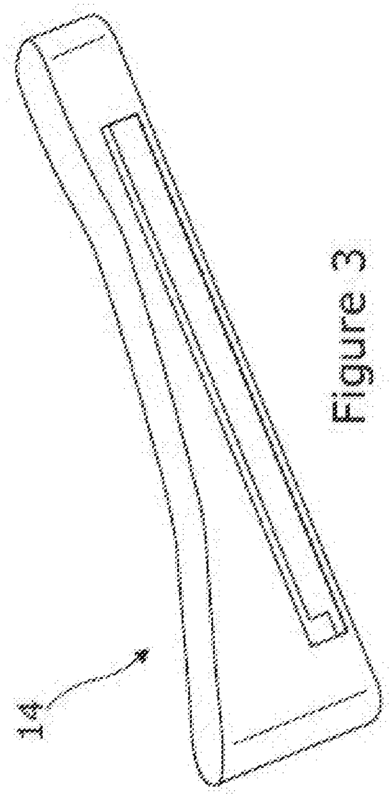
FIG. 3 is an isometric view of the display body of an embodiment.
Figure 6:
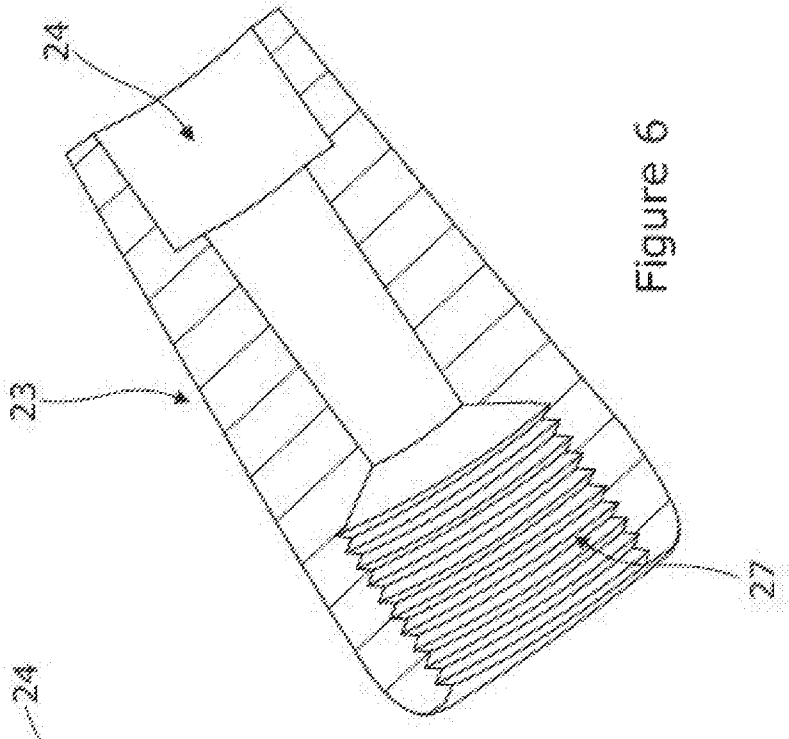
FIG. 6 is a sectional view of the mouthpiece illustrated in FIG. 5 along line B-B with the internal components removed.
Figure 4:
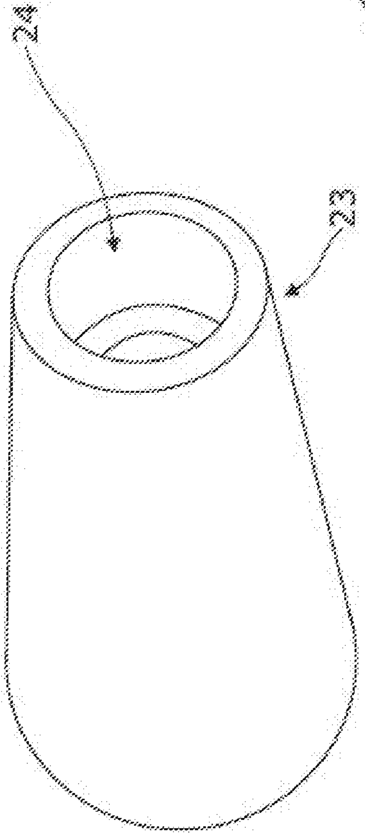
FIG. 4 is an axonometric view from a first end of the mouthpiece illustrated in FIG. 1.
Figure 5:
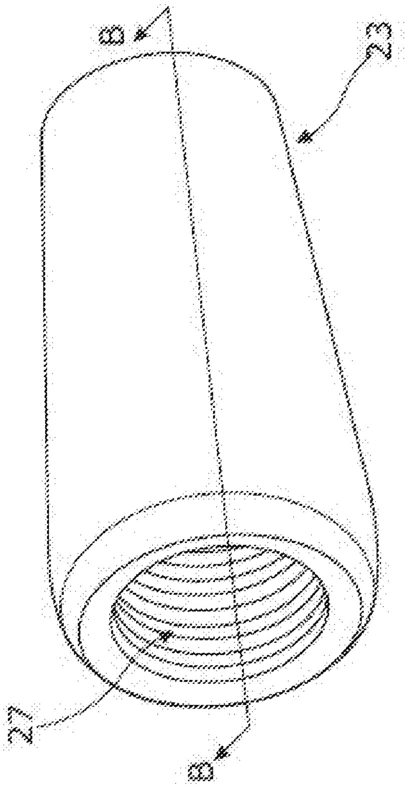
FIG. 5 is an axonometric view from a second end of the mouthpiece illustrated in FIG. 4.

With reference to the accompanying figures, a pressure measurement device for use with a musical instrument is provided in two main embodiments, namely a bespoke musical instrument comprising the pressure measurement device (an integrated device illustrated in FIGS. 1 to 6) and a pressure measurement device which is removably attachable to a conventional musical instrument, such as that illustrated in FIGS. 11 to 16.

In both of the main embodiments illustrated, the device 10 comprises an inlet 11 to receive air from a player of the musical instrument as the player plays the musical instrument and a sensor 12 associated with the inlet 11, the sensor 12 configured to sense information relating to pressure from the received air in real time as the musical instrument is played.

In some embodiment, the pressure measurement device may further comprise:

a. a controller/processor 13 associated with the sensor 12; and b. a display 14 to display real-time data relating to information relating to pressure.

Figure 19:
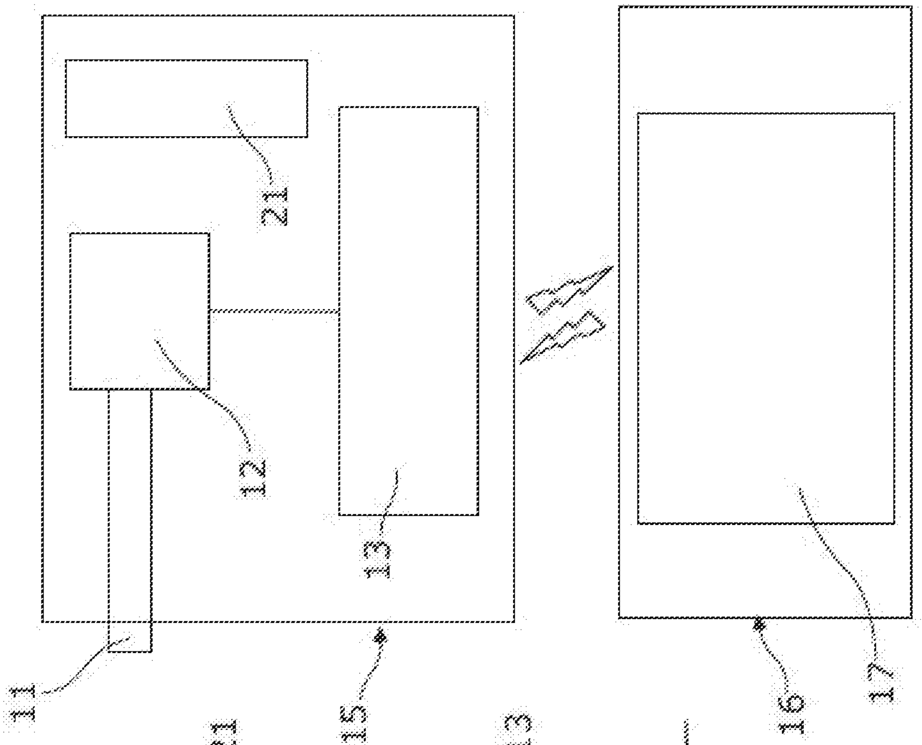
FIG. 19 is a schematic diagram showing the interrelationship of the components another embodiment.
Figure 18:
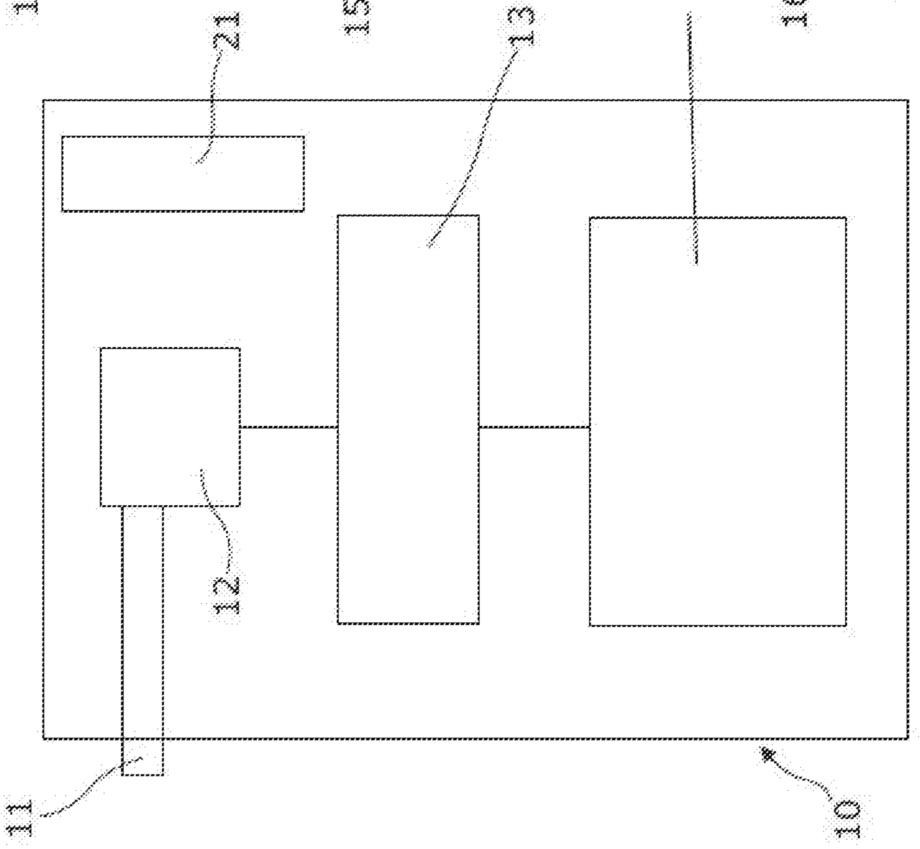
FIG. 18 is a schematic diagram showing the interrelationship of the components an embodiment.

The pressure measurement device 10 may be provided as a single device such as that illustrated in FIG. 18, or as a multi-part device, such as that illustrated schematically in FIG. 19. Any number of parts may be provided in the multi-part device. Any one or more of the components may be provided in any one or more parts. In the embodiment illustrated in FIG. 19, the controller/processor 13 is provided in the base device 15 with the inlet 11 and the sensor 12 (but this does not need to be the case) and a separate display device 16 provided with a display 14 is in wireless communication with the base device 15.

The pressure measurement device or system and/or musical instrument comprising a pressure measurement device or system, may upload the measurement information to a software application allowing patients, relatives and clinician review. The software application will preferably contain a mixture of warm up musical therapy games (akin to the repetitive air clearance routines prescribed by CF therapists), a Guitar Hero™ style musical game, free play musical zone, an/or electronic 'how to play' methods and lessons.

The pressure measurement device may be a 'dumb' device which senses information and then transmits the sensed information to an associated device for processing, which as mentioned above, will remove the processor from the device and located it in the associated device, leaving only a basic controller on the device. The associated device may analyse or process the sensed information and then transmit a lung pressure measurement to a display. The display may be on the device 10 or on a separate device such as a smartphone or tablet or wearable for example.

The pressure measurement device may be a 'smart' device which senses, processes and displays information in real-time on a display associated with the device and which is mounted relative to the musical instrument, such as that illustrated in FIGS. 11 to 16.

The different configurations mentioned above are tailored to age groups of users. For example, the pressure measurement device may be included in a bespoke musical instrument 17 such as that illustrated in FIGS. 1 to 6, in an inline configuration. This embodiment may be particularly adapted for users between approximately 4-7 years. The bespoke instrument 17 may have the pressure measurement device removably incorporated thereinto.

An out of line configuration, such as that illustrated in FIGS. 11 to 16, may be provided for more advanced or older users or those with their own instrument. The pressure measurement device of this configuration is typically adapted to be mounted relative to a conventional instrument, such as the trumpet 18 illustrated, with an airline 19 associated with the mouthpiece 20. The mouthpiece 20 may be adapted or a bespoke mouthpiece may be needed in order to incorporate the airline 19 to connect the mouthpiece 20 with the pressure measurement device 10.

In the out of line configuration, the pressure measurement device 10 may be mounted to the trumpet 18 in a location and/or orientation such that the display 14 of the pressure measurement device 10 can be seen by the user while they are playing the trumpet 18. When used with the trumpet for example, the display 14 of the device 10 is preferably mounted relative to the lead pipe of the trumpet 18 so that the user can see it clearly. In the embodiment illustrated in FIG. 11, a resiliently deformable clamping opening is provided in a lower side of the device 10 so that the device can simply be clamped in position about the lead pipe of the trumpet 18.

The inlet 11 will normally be associated with a mouthpiece 20 of an instrument, or bespoke musical instrument which is powered or played using a player's breath.

The inlet 11 may be integrated into the mouthpiece 20 or attached to the mouthpiece 20. The inlet 11 will preferably at least be associated with the mouthpiece such that a portion of the player's breath enters the at least one inlet contemporaneously with the mouthpiece.

As shown in FIGS. 11 to 16, the inlet 11 may be associated with an elongate conduit or airline 19 associated with the sensor 12 (if the sensor 12 is spaced from the inlet 11). Any type of conduit may be provided. The conduit may be flexible or rigid.

The sensor 12 is preferably mounted on or relative to a body that mounts one or more electronic components such as a controller/processor 13.

The controller/processor 13 is preferably provided in association with the sensor 12 in order to control the sensor 12. The controller/processor 13 will typically receive the information relating to pressure from the air blown into the inlet 11, in real time as the musical instrument is played and convert this information into information relating to the lung pressure used by the player and/or use the information to calculate the lung pressure used by the player. However, the information relating to pressure need not be converted into a lung pressure measurement in order to be useful to a player. For example, air flow rate information may give the player feedback for use in motivating and/or measuring positive expiratory pressure.

The sensor 12 may be a pressure sensor but any other type of sensor that captures information that can be used to convert or calculate into lung pressure could be used.

The electronic components of the device are preferably powered using an onboard power supply. The onboard power supply is preferably one or more batteries 21. Typically, the one or more batteries are rechargeable batteries. If rechargeable, the one or more batteries may be removable and rechargeable or be rechargeable in situ.

The preferred lung pressure measurement that is arrived at in real-time based on the information sensed, is preferably displayed on the display 14. The display 14 of the information in real-time is preferably such that the player can see in real-time, the lung pressure being exerted as they play.

Preferably, the display 14 is an electronic display screen. In this form, the information will normally be displayed thereon in the form of one or more generated and displayed interfaces which are updated in real-time based on the information captured by the sensor 12.

Figures 9, 10, 11, 12, 13, 14, 15, 16:
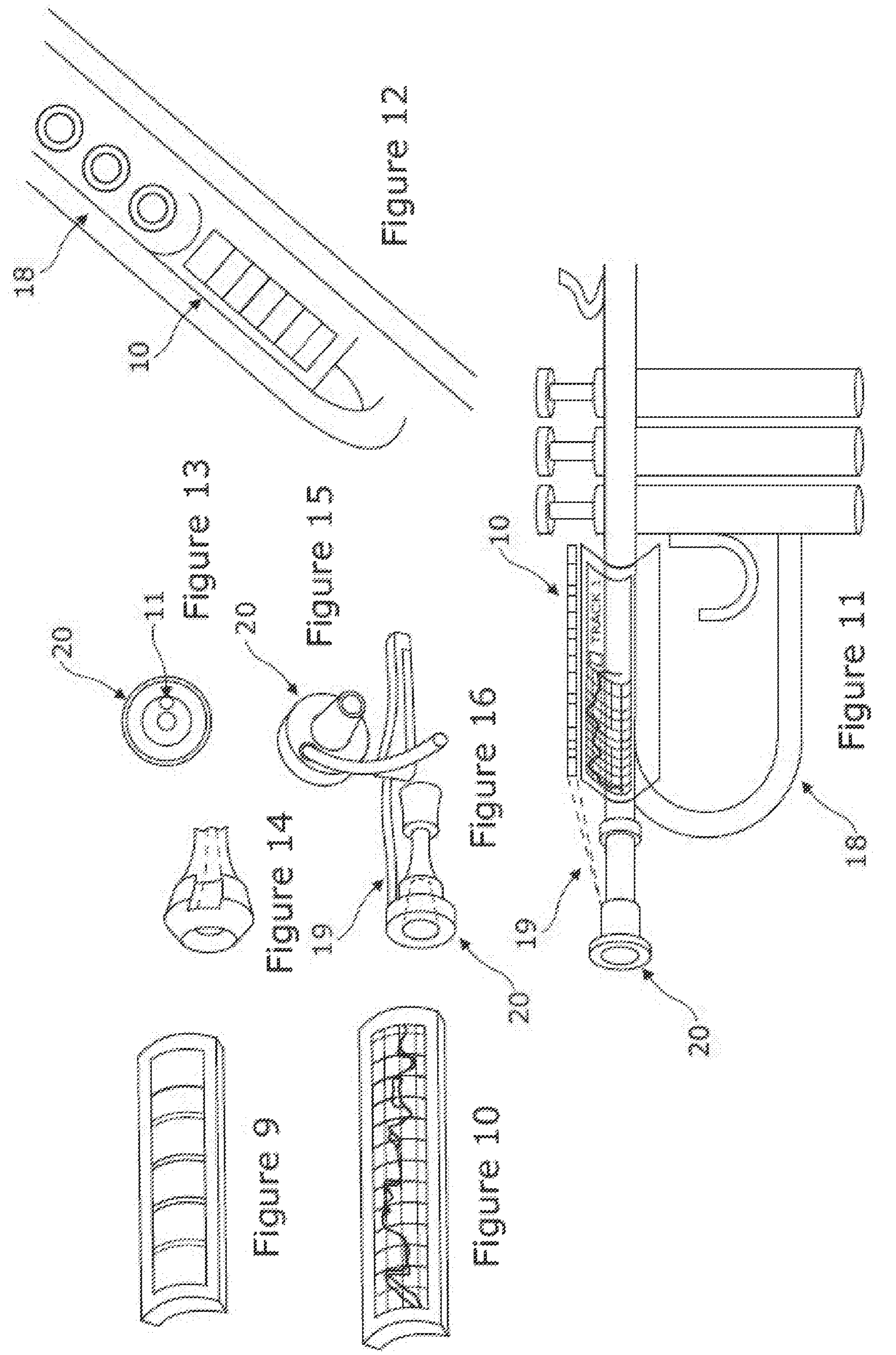
FIG. 9 is a top view of a display according to an embodiment.
FIG. 10 is a top view of a display according to another embodiment.
FIG. 11 is a partial side view of a trumpet with a pressure measurement system of an embodiment associated therewith.
FIG. 12 is a top view of the configuration illustrated in FIG. 11.
FIG. 13 is an end view of a mouthpiece for the trumpet illustrated in FIG. 11.
FIG. 14 is a side view of the mouthpiece illustrated in FIG. 13.
FIG. 15 is a front end view of the mouthpiece illustrated in FIG. 13.
FIG. 16 is a side view of the mouthpiece illustrated in FIG. 13, part way through insertion into the lead pipe.

The information may be displayed in any way and two examples are shown in FIGS. 9 and 10. In FIG. 9 for example, a real time measure is displayed as a moving level or bar that indicates the lung pressure level exerted at any moment. A 'traffic light' system may be used with a red level for a level which is too low, an amber level for an intermediate level and a green level for an adequate or therapeutic level. The value of the thresholds between the levels may be adjustable dependent on the particular player/patient and/or pressure desired.

In FIG. 10, a display trace over time of lung pressure level exerted at any moment is provided, allowing the player to visualise the lung pressure level exerted during play over time.

The information captured by the at least one sensor may be logged/saved. The information may be logged/saved onboard the device, in onboard memory. The information may be logged/saved remotely from the device, on a secondary, associated device and at least one communication device may be provided onboard the device to communicate the information to the secondary device. Any information relating to lung pressure measurement based on the information captured by the at least one sensor may be logged/saved.

In one embodiment (referred to herein as the inline embodiment), a bespoke musical instrument 17, such as that illustrated in FIGS. 1 to 6, is provided which mimics a real instrument in terms of playability and relative positioning of the mouthpiece 23 and the buttons/keys/valves 22 used to sound different notes. The bespoke musical instrument 17 is typically an electronic instrument, sounding each note electronically based on the player blowing into the mouthpiece 23 and actuation of the buttons/keys/valves 22. The buttons/keys/valves 22 are associated with an electronics system which identifies the note intended based on the actuation of the buttons/keys/valves 22 and then sounds the note, preferably through a speaker associated with the bespoke musical instrument 17.

Different bespoke musical instruments may have different configurations, being based on a different base instrument. For example, the bespoke musical instrument may mimic the appearance and operability of any brass instrument, any woodwind instrument or any other instrument which normally operates dependent on the breath of the player.

The bespoke musical instrument 17 illustrated in FIGS. 1 to 6 is based on a trumpet and includes a mouthpiece 23 with an opening 24 into which a player blows, a body portion 25 which is normally the component relative to which the buttons/keys/valves 22 are located and an outlet/bell portion 26, which typically houses the electronic components such as the controller/processor 13, the battery 21 and the sensor 12. An opening or outlet is typically provided through which the spent breath leaves the instrument 17 and this may be provided in any location after the inlet 11. The outlet need not mimic the position of the outlet of the actual instrument.

The inlet 11 of the pressure measurement device is typically associated with the opening 24 in the mouthpiece 23. The inlet 11 is preferably positioned to receive a representative portion of a player's breath. The inlet in the embodiment illustrated in FIGS. 1 to 6 leads to a central bore within the mouthpiece 23, relative to the opening 24 in the mouthpiece 23.

The mouthpiece 23 of the bespoke musical instrument 17 shown is removably attachable relative to the body portion 25 of the bespoke musical instrument 17. This allows at least partial disassembly of the bespoke musical instrument for transport, cleaning or storage for example. A screw thread 27 is used in the embodiment illustrated in FIGS. 1 to 6, particularly FIGS. 5 and 6 but any mechanism may be used. A corresponding screw thread is shown on the body portion 25 in FIGS. 1 and 2.

The body portion 25 of the bespoke musical instrument 17 is the main portion normally held by the player. The body 25 as shown mounts the buttons/keys/valves 22 to allow the player to designate the note that is intended to be sounded during play.

The body portion 25 may typically mount electronic components allowing operation of the sensor 12 but the electronic components may be provided in the bell portion 26 or divided between the body portion 25 and the bell portion 26.

The e controller/processor 13 is typically provided in association with the body portion 25 to control the operation of the sensor 12 and the buttons/keys/valves 22. Where the bespoke musical instrument 17 is configured to emit sounds electronically based on actuation of the buttons/keys/valves 22, the controller/processor 13 will normally control this functionality. The controller/processor 12 may cause a sound to be generated and sounded based on the actuation of the buttons/keys/valves 22 as the player blows into the mouthpiece 23. The notes are preferably generated and sounded electronically. A base or threshold minimum air pressure will normally be required to cause a note to be sounded.

A speaker (not shown for clarity) may be associated with the bespoke musical instrument 17 in order to emit the notes preferably generated and sounded electronically. Where the bespoke musical instrument 17 includes a bell or outlet such as is shown in FIGS. 1 to 6, the speaker will preferably be located relative to the bell or outlet portion 26.

Alternatively, the speaker may be provided on, in or relative to an external device to sound the note based on the use of the bespoke musical instrument 17. This configuration requires real-time communication between the bespoke musical instrument 17 and the external device.

The controller/processor will typically be powered by a battery 21 onboard the bespoke musical instrument 17. Usually, a single battery 21 is provided. In the embodiment illustrated in FIGS. 1 to 6, the battery 21 is provided in an accessible location relative to the bespoke musical instrument 17, such as at or toward a terminal end of the bespoke musical instrument 17, in the bell portion 26.

Figure 7:
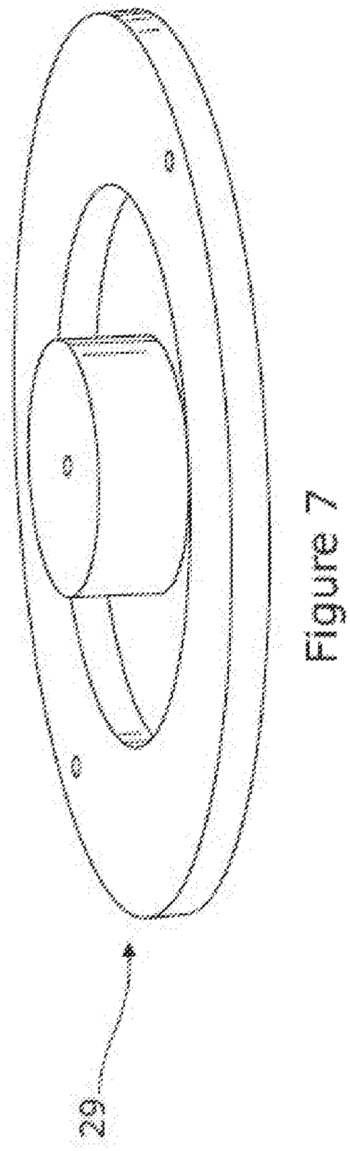
FIG. 7 is an isometric view of an end plate for the bell end of the musical instrument illustrated in FIG. 1.
Figure 8:
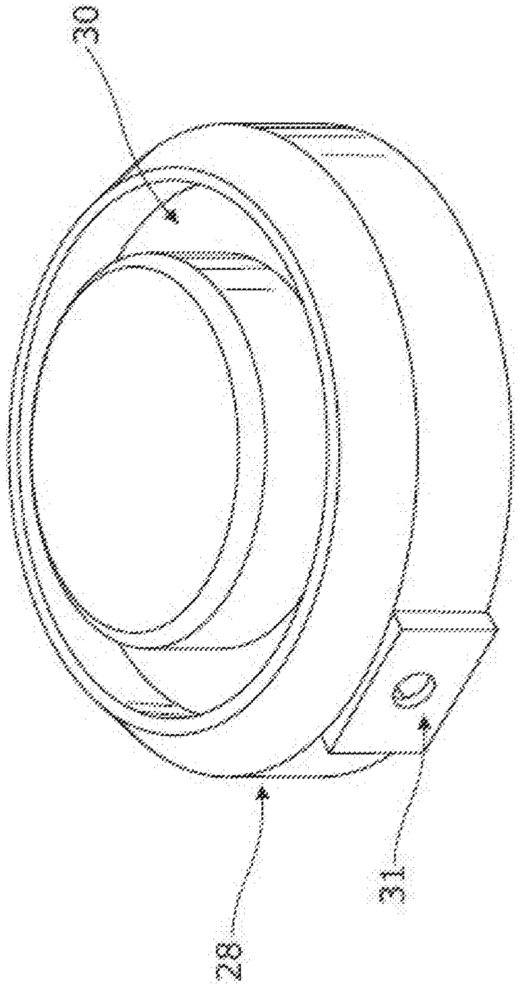
FIG. 8 is an isometric view of a charging station for use with the musical instrument illustrated in FIG. 1.

The battery 21 is typically rechargeable. Any charging mechanism can be used. The bespoke musical instrument 17 illustrated in FIGS. 1 to 6 includes a capacitive charging system. A capacitive charging coil is provided onboard the bespoke musical instrument 17, in the bell portion 26 and connected to the battery 21. An external capacitive charging station 28 such as that illustrated in FIG. 8 can then be provided to effect wireless charging of the battery 21. The capacitive charging coil is provided in the bell portion 26 such that the bell portion 26 can be oriented relative to the capacitive charging station 28 to charge the battery 21. The capacitive charging coil is provided substantially parallel with the end cap 29. The bell portion 26 is provided with an end cap 29, as illustrated in FIG. 7 and/or a shaped configuration to engage the capacitive charging station 28. An end rim of the bell portion 26 may be received in the annular gutter 30 in the charging station to locate the instrument 17 and position the capacitive charging coil. A connection port 31 is provided on the charging station 28 to connect to a mains power supply.

The bell portion 26 is preferably hollow and provided with an internal volume 32 (best illustrated in FIG. 2) to contain the electronic components of the bespoke musical instrument 17. The end cap 29 is inserted into the open end of the bell portion 26 and abuts the circumferential abutment shoulder 33 illustrated in FIG. 2. The end cap 29 is fived there using any releasable attachment mechanism.

The controller/processor 13 will normally operate an onboard software application to receive information from the sensor 12 and/or other inputs on the bespoke musical instrument 17 such as the buttons/keys/valves 22. The controller/processor 13, via the software application will preferably convert the information from the sensor 12 into a lung pressure measurement, preferably for display. The software application will also preferably operate to sound the notes according to the actuation by the player of the buttons/keys/valves 22.

Typically, once the lung pressure measurement has been arrived at, a measure of the lung pressure measurement will be displayed on display 14, however provided.

As mentioned above, the display 14 is normally provided on the bespoke musical instrument 17, normally positioned relative to the body portion 25 of the bespoke musical instrument 17, as shown in FIG. 1 in particular. The display 14 is positioned such that the player can see the display 14 as they play the instrument. For example, for the bespoke trumpet illustrated in FIGS. 1 to 6, the display 14 is located adjacent to the valves/valve buttons 22, closer to the bell portion 26. The display 14 may be offset laterally from the valves/valve buttons 22 as this may mean that the display 14 is more easily viewable around the player's fingers.

As shown in FIG. 1 in particular, the display 14 is preferably integrated into the body portion 25 of the bespoke musical instrument 17. The display 14 may be separable from the body portion 25. The display 14 shown is mounted in an opening 34 in the body portion 25. The display 14 includes an angled outer surface to orient the display 14 relative to the player to allow the player to see the display 14 more easily when playing. The display may show a lung pressure measurement, for example as illustrated in FIGS. 9 and 10.

The buttons/keys/valves 22 are typically provided relative to the body portion 24 of the bespoke musical instrument 17. The buttons/keys/valves 22 will generally be provided in a location/number/configuration to mimic or simulate the position of the buttons/keys/valves on a real instrument.

The buttons/keys/valves 22 of the bespoke musical instrument illustrated are electronically actuable. In the illustrated embodiment, three touch actuable buttons/keys/valves 22 are provided. The touch actuable buttons/keys/valves 22 are capacitive. Actuation of the buttons/keys/valves 22 may trigger tactile and/or audible, preferably haptic feedback.

As shown, the buttons/keys/valves 22 are preferably integrated into the body portion 25 of the bespoke musical instrument 17.

In the embodiment illustrated in FIGS. 11 to 16, the pressure measurement device is provided in an 'out of line' embodiment, associated with a real instrument, which is played as normal.

In this embodiment, the device 10 is provided in a housing with an elongate airline 19 attached thereto and which extends to the mouthpiece 20 where the inlet 11 is located. The housing will preferably include components such as the sensor 12, the controller/processor 13, onboard battery 21 and display 14 in a single unit which is attachable to a conventional instrument, such as the trumpet 18 shown.

In this configuration, the inlet 11 is provided as an opening to the airline conduit 19 connected to the housing and associated with the sensor. As shown, the outer end of the airline conduit 19 is mounted within to the mouthpiece 20 of the trumpet 18 such that a representative portion of breath of the player enters the inlet 11 as the player plays the trumpet 18. The mouthpiece 20 is adapted to include the opening within the mouthpiece 20 as shown in FIGS. 13 to 16.

The preferred single unit of this embodiment is typically removably attachable to a conventional instrument, such as a trumpet 18. The unit is preferably attached in a location and orientation in which the display 14 can be seen by the player during play.

The unit will also normally include the controller/processor 13 powered by a battery 21 onboard the unit. The battery 21 is typically rechargeable. In this embodiment, an externally accessible charging port may be provided in association with a charging device to allow connection of an electrical cable to charge the at least one battery from an external power source such as mains power.

In this embodiment, the controller/processor 13 typically operates an onboard software application to receive information from the sensor 12. The controller/processor 13, via the software application, will preferably convert the information from the sensor 12 into a lung pressure measurement for display.

In some embodiments such as that illustrated schematically in FIG. 19, the display 14 may be provided as a part of a separate display device 16 which is in communication with the base pressure measurement device 15. The at least one controller/processor 13 provided in the base pressure measurement device 15 may be configured for communication with the display device 16 to as to cause the display of information on the display device 16. This configuration requires real-time communication between the base pressure measurement device 15 and the display device 16. One or more appropriate communication device, providing at least one communications pathway between the base pressure measurement device 15 and the display device 16 will normally be provided in the base pressure measurement device 15.

In this configuration, the instrument with the base pressure measurement device 15 attached thereto is preferably played as normal (the instrument will produce sounds according to normal usage) and a lung pressure measurement is displayed on the display on the display device 16.

The information may be displayed on more than one display, displaying the same information, similar information or disparate information. For example, at least one display on a remote device may mirror the information displayed on at least one display provided on the device. At least one display on a remote device may display suggested note information for the player to follow while the lung pressure information is displayed on at least one display provided on the device. The software application may monitor the player's accuracy and score the player's accuracy, to turn the treatment using the device into a game.

An analysis software application or software application part may be provided to analyse the player's breathing as measured by the at least one sensor.

Any one or more parts of the information captured by the at least one sensor and/or calculated by the at least one controller/processor may be logged on the device, and/or on an external device.

Figure 17:
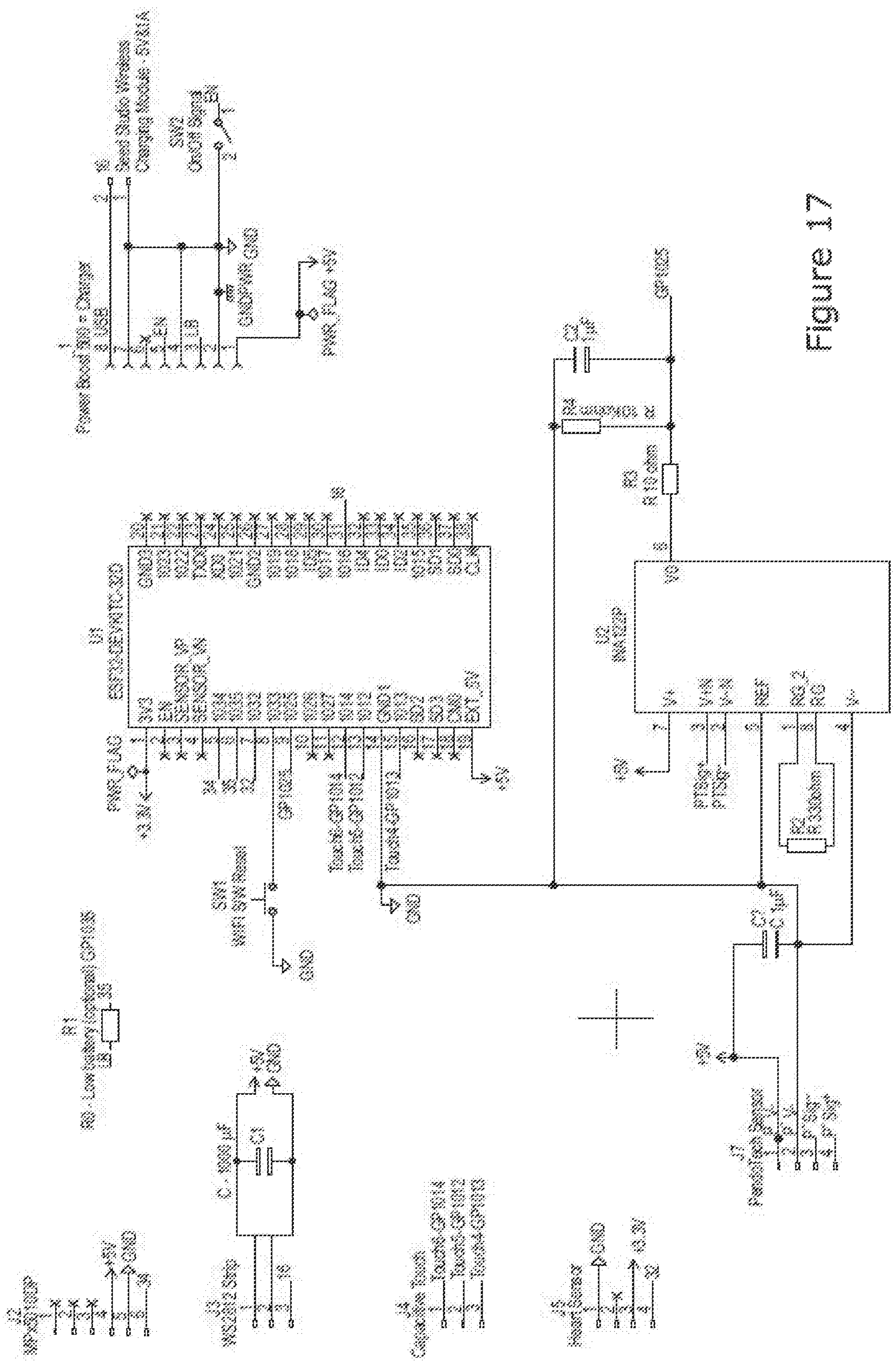
FIG. 17 is a schematic electrical pin diagram showing an electrical system of an embodiment including a sensor for measuring lung pressure.

In FIG. 17, an example of a pin configuration which can be used is shown. The capacitor illustrated in FIG. 17 is an 0805 footprint whereas a through hole connector will more likely be used.

A more developed version of a bespoke musical instrument 80, in this case, simulating a trumpet, is shown in FIGS. 20 to 26. In this configuration, the main components of the pressure measurement system are provided in a pressure chamber component 81 which is releasably attachable relative to a main body 82 of the bespoke musical instrument 80, which contains other components such as the battery 83, USB charging port 84 and main electronics 85 and a Hall effect sensor 86 as well as the actuable buttons 87 (simulating the valves of a trumpet) and display 88.

Figure 20:
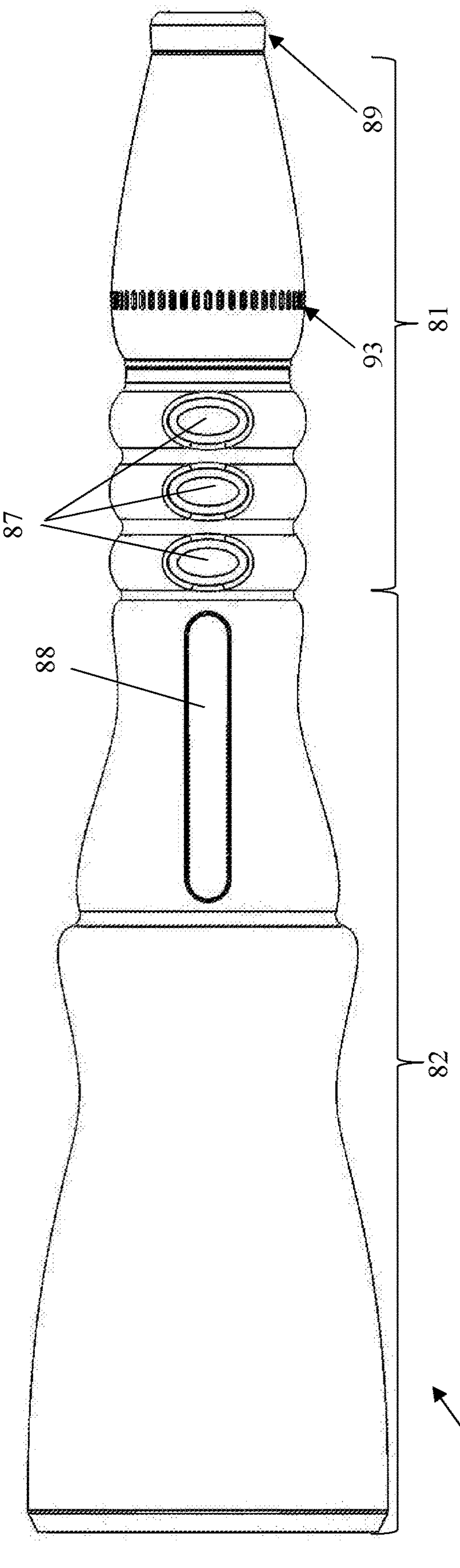
FIG. 20 is a top view of a bespoke musical instrument with a pressure measurement system according to a further embodiment.
Figure 21:
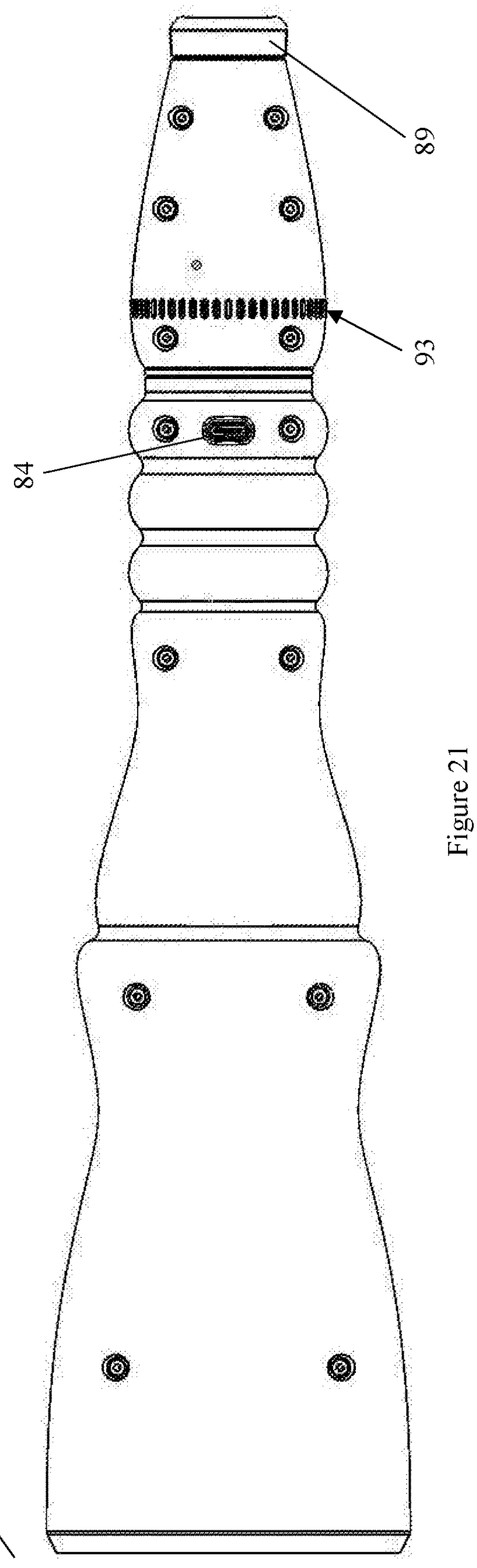
FIG. 21 is a bottom view of the bespoke musical instrument illustrated in FIG. 20.
Figure 22:
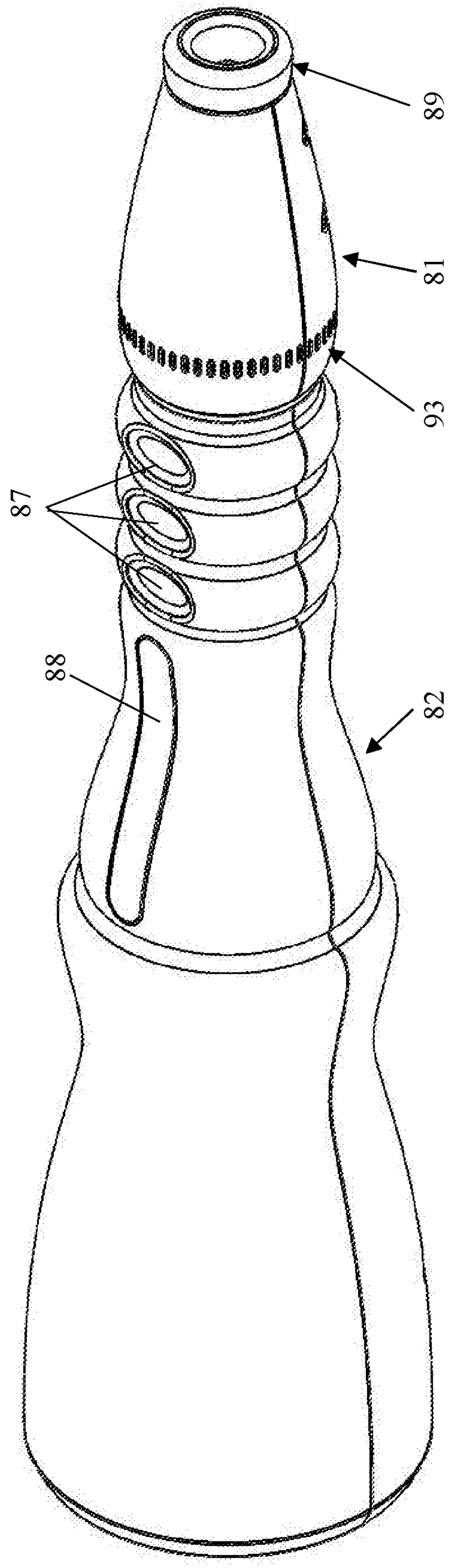
FIG. 22 is an isometric view of the bespoke musical instrument illustrated in FIG. 20.
Figure 23:
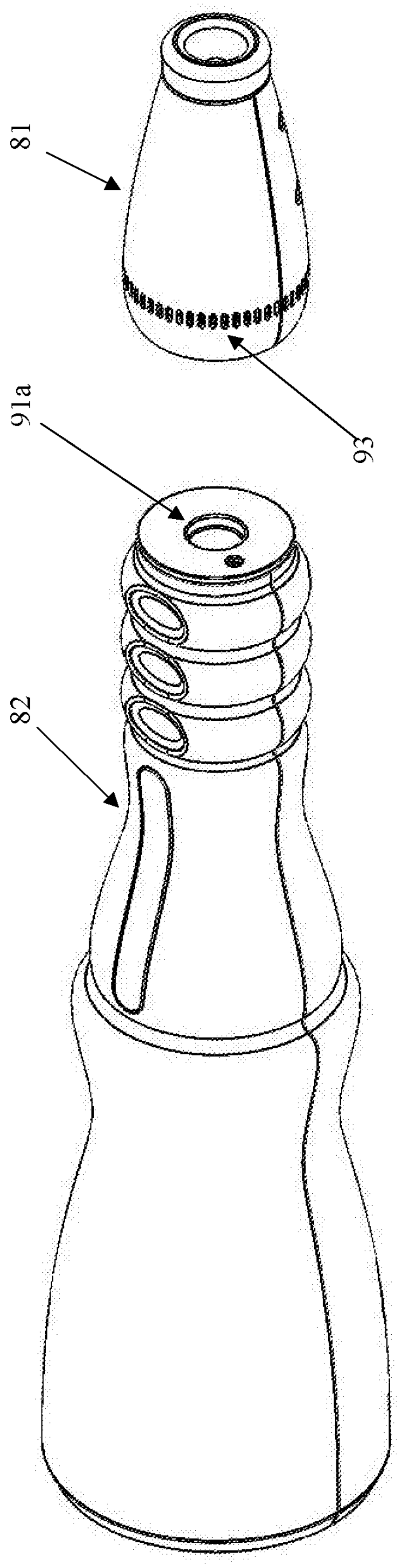
FIG. 23 is an isometric view of the bespoke musical instrument illustrated in FIG. 22 with the pressure chamber separated.
Figure 24:
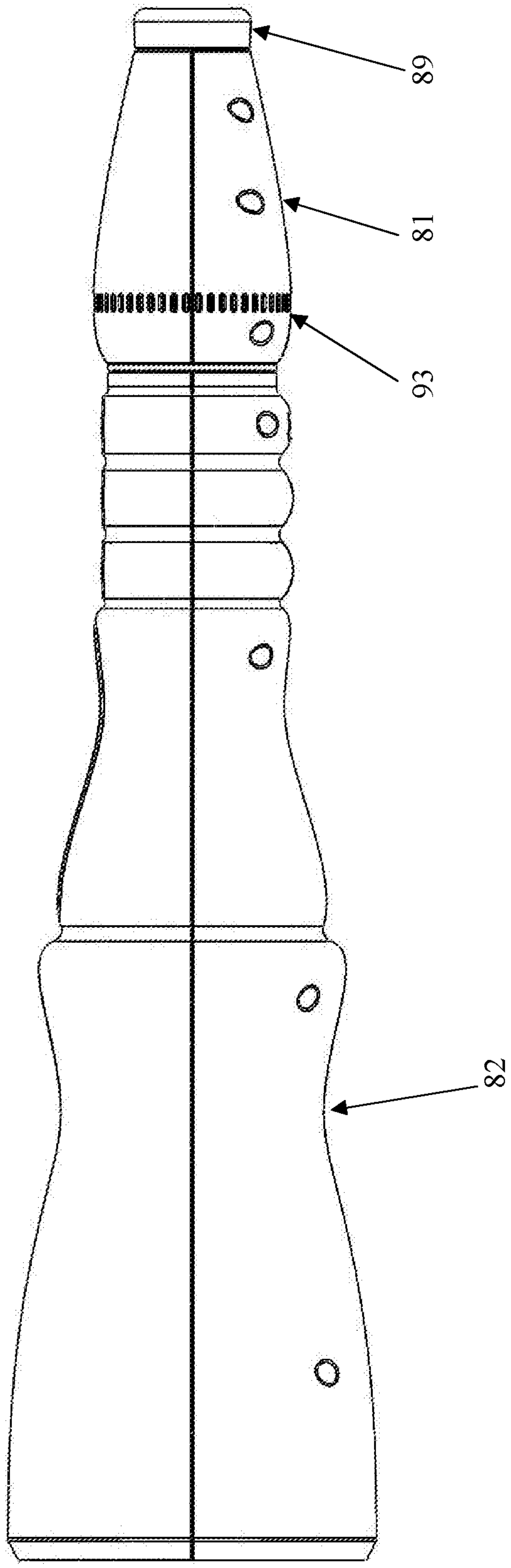
FIG. 24 is a side view of the bespoke musical instrument illustrated in FIG. 20.

The bespoke musical instrument 80 shown in FIGS. 20 to 22 has two parts as shown in FIG. 23, namely the main body 82 and a pressure chamber component 81. The pressure chamber component 81 has an associated mouthpiece 89 already mounted in FIGS. 20 to 24 but shown separately in FIG. 25.

Figure 25:
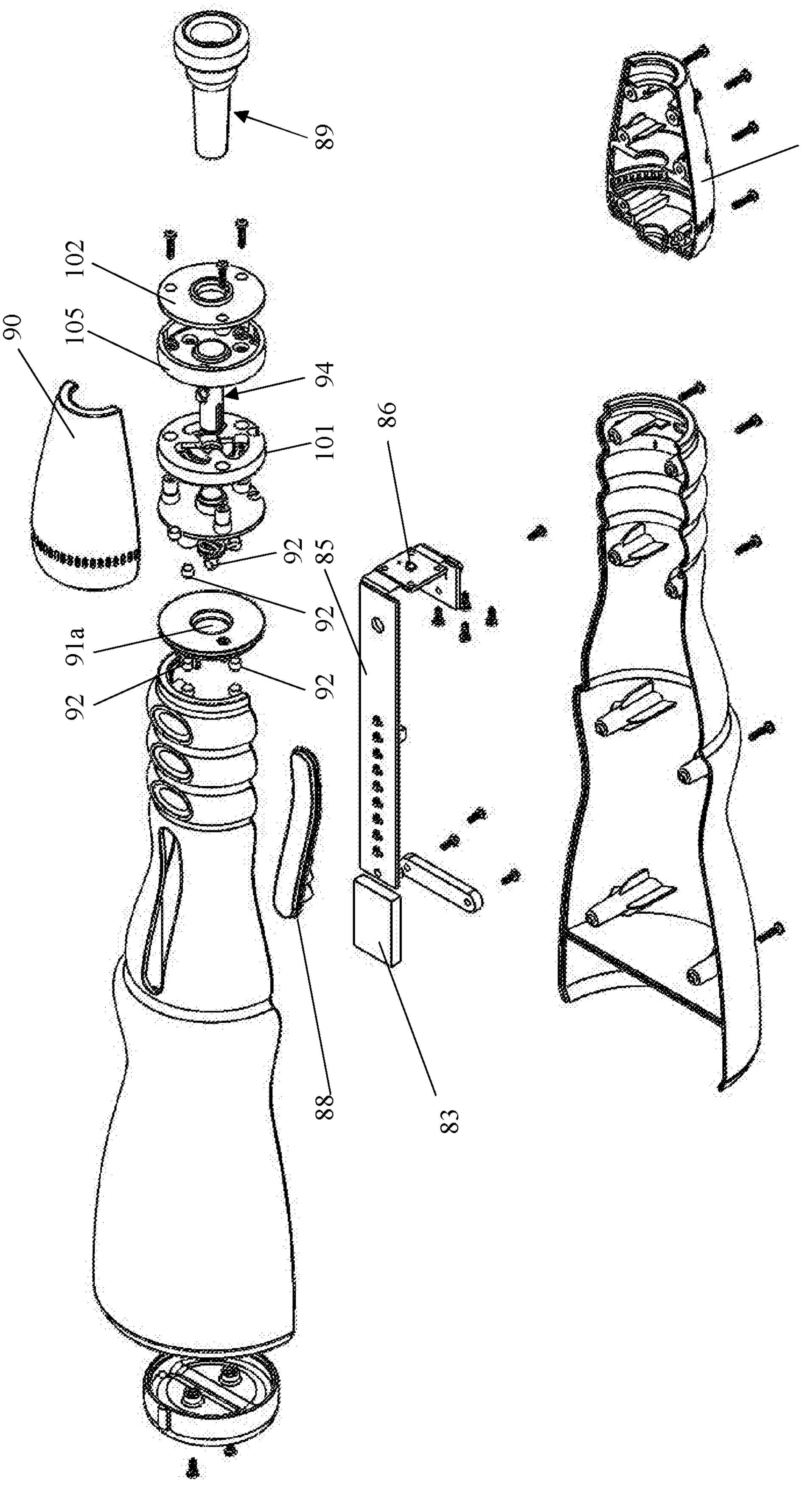
FIG. 25 is an exploded view of the bespoke musical instrument illustrated in FIG. 20.
Figure 26:
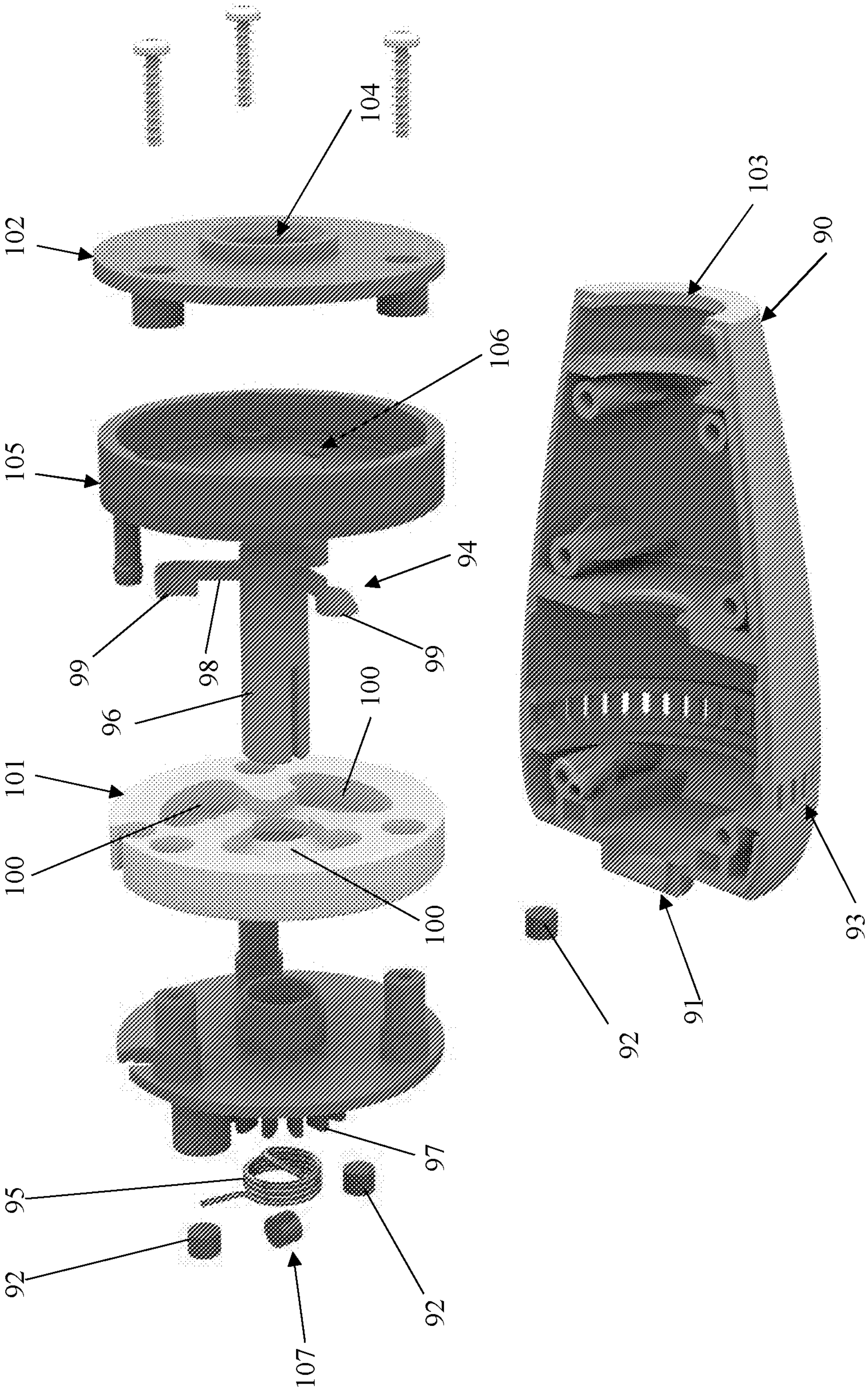
FIG. 26 is a detailed exploded view of the pressure chamber of the bespoke musical instrument illustrated in FIG. 20.
Figure 27:
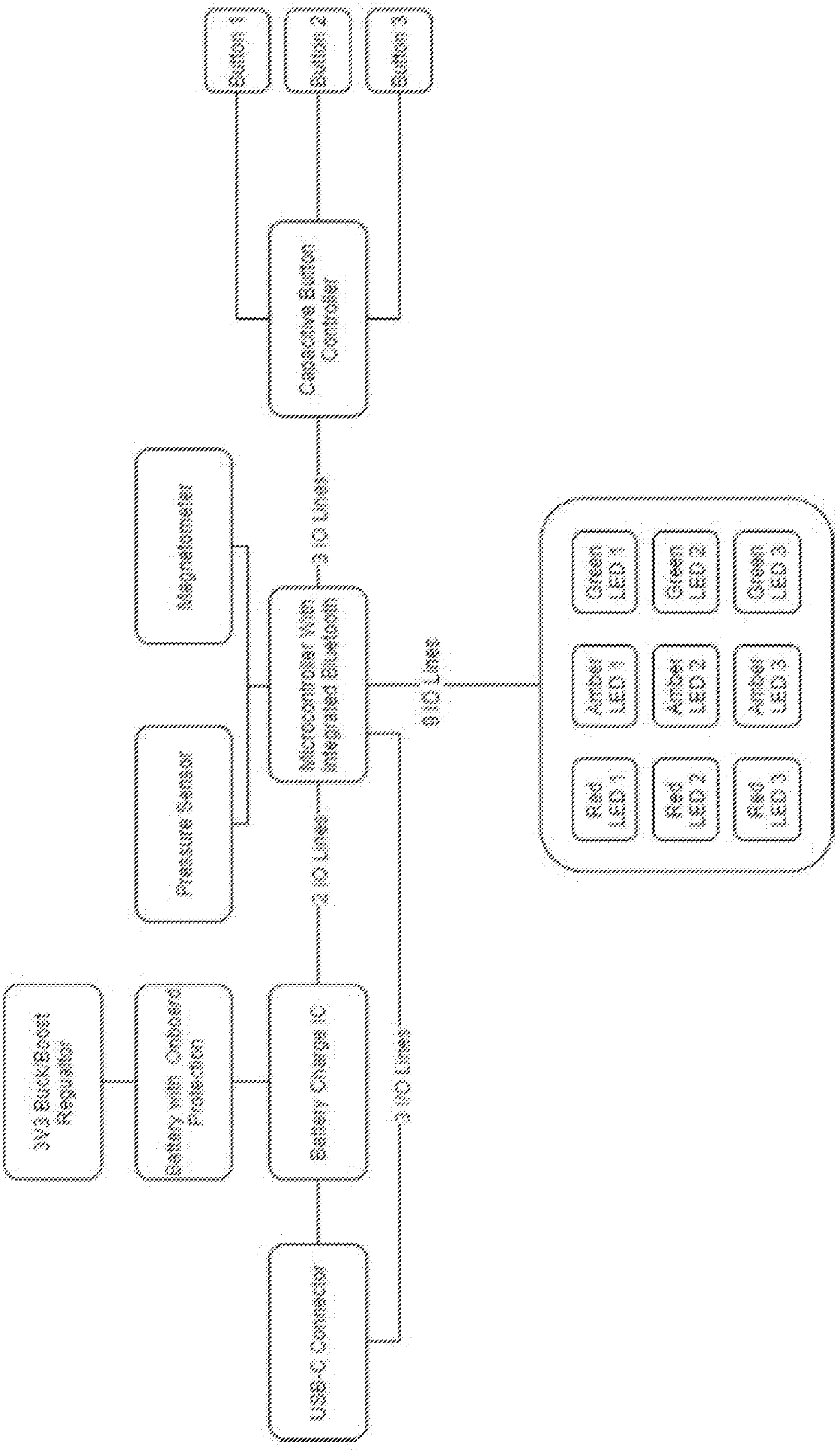
FIG. 27 is a schematic representation of the components of the bespoke musical instrument illustrated in FIG. 20.

As shown in FIG. 25, the pressure chamber component 81 includes an outer housing to protect and contain the working components. The illustrated housing is a multipart housing, with two housing parts 90 attached to one another to form the housing. The housing parts 90 may be attached to one another in any way, but one simple method is using screws as illustrated.

The pressure chamber component 81 is shaped to correspond with the main body 82 of the bespoke musical instrument 80. The shape of the pressure chamber component 81 allows the mouthpiece 89 to be removable fitted relative to the pressure chamber component 81.

The shape of the pressure chamber component 81 is such that the pressure chamber component 81 is engageable with the main body 82 in the correct orientation. A central protrusion 91 is provided on an outer portion of a lower end of the housing of the pressure chamber component 81 to be received in a corresponding opening 91*a* on the main body 82.

The pressure chamber component 81 is securable to the main body 82. A magnetic mechanism is used in the illustrated embodiment because corresponding magnetic components 92 can be located within the housing of the pressure chamber component 81 and the housing of the main body 82 to secure the components together. In the illustrated embodiment, a number of magnets are provided spaced about a lower end of the pressure chamber component 81 and an upper end of the main body 82 as shown in FIG. 25.

A plurality of exhaust openings 93 are provided through the housing to allow spent air to escape from the pressure chamber component 81 in the illustrated embodiment.

In the embodiment illustrated in FIGS. 20 to 26, a rotating spindle 94 is provided within the pressure chamber component 81 to rotate when air is blown into the pressure chamber component. 81 through the mouthpiece 89. The rotating spindle 94 reciprocates in rotation, rotating back and forth. The rotating spindle 94 is biased into a first position and is rotated to one or more second positions by the air blown into the pressure chamber component 81 against the bias of a biasing spring. The biasing spring in the illustrated embodiment is a coil spring 95. The coil spring 95 has a first end associated with the rotating spindle (in FIG. 25, the slot in the end of the elongate body 96) and a second end anchored relative to a fixed position within the pressure chamber component 81. Multiple fixed positions are provided to allow adjustment of the biasing force applied. In the embodiment illustrated in FIG. 25, a number of openings are provided between fingers 97, to allow the second end of the coil spring 95 to be received in any one of the openings.

The rotating spindle 94 illustrated, has an elongate body 96 extending substantially coaxially with the pressure chamber component 81. A number of arms 98 radiate from the elongate body 96. Each arm 98 is provided with a shaped portion 99 (in the illustrated embodiment, at the end of the arms 98) against which the air blown into the pressure chamber component 81 acts, to rotate the spindle 94.

Each arm 98 is located in a shaped recess 100 to define limits to the rotation. The shaped recesses 100 are provided on or into a shaped body 101. An opening (not visible) is provided in association with each shaped recess 100 to allow spent air to escape from the shaped recess 100 and then to escape the housing through the exhaust openings 93.

A spacer 102 is provided with a central opening 104 herein to receive a portion of the mouthpiece 89. Typically, a mouthpiece opening 103 is provided in an upper end of the housing 90 for insertion of an elongate portion of a mouthpiece 89. The central opening 104 is aligned with the mouthpiece opening 103 but spaced from the mouthpiece opening 103 towards the lower end of the pressure chamber component 81.

An air guide 105 is provided to guide air blown into the pressure chamber component 81 through the central opening 104 in the spacer 102, to the rotating spindle 94. The air guide 105 defines a volume with the spacer 102. One or more openings 106 are provided in the air guide 105 to guide the air blown into the pressure chamber component 81 to the rotating spindle 94.

The working components within the pressure chamber component 81 may be provided as a cassette mechanism and mounted in a receiving slot within the pressure chamber component housing. A central opening may be provided in all components to receive the elongate body 96 of the spindle 94 therethrough.

A lower end of the elongate spindle 94 may be provided with or is associated with an element that allows a sensor 86 to measure rotation, to thereby determine the rotation with a pressure or air being blown into the pressure chamber component 81. A simple yet robust mechanism may include a magnetic element 107. The sensor 86, such as a Hall effect sensor, can then be provided to measure one or more characteristics of the magnetic element 107, such as speed or rotation/reciprocation, to determine to a pressure or air being blown into the pressure chamber component 81.

As illustrated, the sensor 86 is located in the main body 82 such that when the pressure chamber component 81 is properly mounted relative to the main body 82, the sensor 86 is located adjacent to the magnetic element 107 to be sensed.

As mentioned above, the main body 82 will normally include other components such as the battery 83, a charging port 84 (if a cable is used) and main electronics, for example in the form of a PCB 85.

A secondary sensor may be provided on the bespoke musical instrument to allow a check to be provided of the pressure or air being blown into the pressure chamber component. The secondary sensor may provide a check on the main sensor and/or may provide a backup, should the main sensor fail. The secondary sensor may the same type as the primary sensor but normally will be of a different, typically a simpler type such as a flow sensor.

In the embodiment illustrated in FIGS. 20 to 26, a display 88 is mounted on the main body 82. The display 88 may include one or more lights or elements that may be lit based on the determination of pressure based on information from the sensor, to give an indication of the pressure. The 'traffic light' system may be used with a red level for a level which is too low, an amber level for an intermediate level and a green level for an adequate or therapeutic level. If the traffic light system is used, the red level may be closest to the user and the green level furthest from the user. This provides a real-time indication of the pressure of the air blown into the instrument by the user that the user can see as they play the instrument.

The one or more embodiments are described above by way of example only. Many variations are possible without departing from the scope of protection afforded by the appended claims.

What is claimed is:

1. A pressure measurement device for use with a musical instrument, the device comprising:

a. A mouthpiece with at least one inlet to receive air from a player of the musical instrument as the player plays the musical instrument and one or more exhaust openings to allow spent air to escape laterally from the mouthpiece; and b. At least one sensor associated with the at least one inlet;

wherein the at least one sensor is configured to sense information relating to lung pressure and lung capacity from the received air in real time as the musical instrument is played.

2. A pressure measurement device as claimed in claim 1, further comprising at least one processor associated with the at least one sensor to process the information relating to lung pressure and lung capacity.

3. A pressure measurement device as claimed in claim 1, wherein the at least one sensor is a pressure sensor.

4. A pressure measurement device as claimed in claim 1, further comprising at least one display to display real-time information relating to lung pressure and lung capacity and/or calculated using the information relating to lung pressure and lung capacity.

5. A pressure measurement device as claimed in claim 3, wherein the pressure measurement device is provided as a multi-part device with any one or more of the components provided in any one or more parts.

6. A pressure measurement device as claimed in claim 4, wherein the at least one display is an electronic display screen, the information displayed thereon in the form of one or more generated and displayed interfaces updated in real-time to give an indication of pressure of the received air, based on the information captured by the at least one sensor.

7. A pressure measurement device as claimed in claim 1, wherein the device is configured as a bespoke musical instrument to mimic a real instrument in terms of playability and relative positioning of a mouthpiece and buttons/keys/valves used to sound at least one note.

8. A pressure measurement device as claimed in claim 7, wherein the bespoke musical instrument is an electronic instrument comprising an electronics system to identify the at least one musical note intended based on actuation of the buttons/keys/valves, sounding each at least one musical note electronically based on the player blowing into the mouthpiece and actuation of the buttons/keys/valves.

9. A pressure measurement device as claimed in claim 7 comprising the mouthpiece with an opening into which a player blows, a body relative to which the buttons/keys/valves are located and an outlet/bell.

10. A pressure measurement device as claimed in claim 9, wherein the at least one inlet of the pressure measurement device is associated with the opening in the mouthpiece, positioned to receive a representative portion of a player's breath.

11. A pressure measurement device as claimed in claim 9 wherein at least one controller/processor is associated with the at least one inlet and the buttons/keys/valves to control emission of sounds electronically based on actuation of the buttons/keys/valves.

12. A pressure measurement device as claimed in claim 11 further comprising at least one sound emitter to emit the notes generated and sounded electronically.

13. A pressure measurement device as claimed in claim 1 comprising at least one communication device providing at least one communication pathway provided on the bespoke musical instrument to allow communication with at least one remote associated electronic device.

14. A musical instrument comprising a pressure measurement device as claimed in claim 1.

15. A pressure measurement system for use with a musical instrument, the system including:

a. a pressure measurement device comprising:

i. A mouthpiece with at least one inlet to receive air from a player of the musical instrument as the player plays the musical instrument and one or more exhaust openings to allow spent air to escape laterally from the mouthpiece; and ii. at least one sensor associated with the at least one inlet; and iii. at least one processor associated with the at least one sensor;

wherein the at least one sensor is configured to sense information relating to lung pressure and lung capacity from the received air in real time as the musical instrument is played; and b. an associated device operatively associated with the pressure measurement device, the associated device including at least one display to display real-time data relating to information relating to lung pressure and lung capacity.

16. A pressure measurement system as claimed in claim 15, further comprising at least one sound emitter may be provided on, in or relative to the associated device to sound at least one musical note based on the use of the musical instrument.

17. A pressure measurement system as claimed in claim 15, wherein a real-time communication link is provided between the pressure measurement device and the associated device.

18. A pressure measurement system as claimed in claim 15, wherein the pressure measurement device comprises at least one controller/processor configured for communication with the associated device to cause the display of information on the associated device.

19. A musical instrument comprising a pressure measurement system as claimed in claim 15.

* * * * *